US011984280B2

(12) United States Patent
Fleege et al.

(10) Patent No.: US 11,984,280 B2
(45) **Date of Patent: *May 14, 2024**

(54) REMOTE CONTROLLED MINIATURE CIRCUIT BREAKER WITH HELICAL GEAR AND DC MOTOR

(71) Applicant: Schneider Electric USA, Inc., Andover, MA (US)

(72) Inventors: Dennis W. Fleege, Cedar Rapids, IA (US); Salaheddine Faik, Marion, IA (US); Chad R. Mittelstadt, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,550

(22) Filed: Nov. 14, 2022

(65) Prior Publication Data

US 2023/0075379 A1 Mar. 9, 2023

Related U.S. Application Data

(63) Continuation of application No. 17/353,888, filed on Jun. 22, 2021, now Pat. No. 11,501,929.

(51) Int. Cl.
*H01H 3/26* (2006.01)
*H01H 3/40* (2006.01)

(52) U.S. Cl.
CPC ................ *H01H 3/26* (2013.01); *H01H 3/40* (2013.01); *H01H 2227/036* (2013.01); *H01H 2231/032* (2013.01)

(58) Field of Classification Search
CPC .......... H01H 21/22; H01H 71/52; H01H 9/20; H01H 15/02; H01H 3/26; H01H 3/40
(Continued)

(56) References Cited

U.S. PATENT DOCUMENTS

| | | | |
|---|---|---|---|
| 5,861,784 | A | 1/1999 | Heise et al. |
| 9,607,797 | B2 | 3/2017 | Najera et al. |

(Continued)

FOREIGN PATENT DOCUMENTS

| | | |
|---|---|---|
| DE | 3028812 A1 | 2/1982 |

OTHER PUBLICATIONS

Extended European Search Report dated Feb. 6, 2023 for corresponding European Patent Application No. 1 22179791.3-1201, 11 pages.

*Primary Examiner* — Renee S Luebke
*Assistant Examiner* — Iman Malakooti
(74) *Attorney, Agent, or Firm* — Locke Lord LLP

(57) ABSTRACT

A remote controlled miniature circuit breaker includes a helical gear that engages with mating teeth of a slider plate coupled to main contacts of the circuit breaker, the helical gear including a flat portion to allow the sliding plate to slide past the helical gear. A unidirectional motor responds to an external signal to drive the helical gear while engaging the mating teeth of the slider plate, thereby moving the slider plate to close the main contacts. The motor is configured to respond to an external signal to resume the unidirectional rotation of the helical gear to position the flat portion of the gear to allow the slider plate to slide past the helical gear and contact a kicker lever to thereby open the main contacts. A trip lever pivotally mounted separately from the kicker lever, pushes the kicker lever to open the main contacts in a trip operation.

18 Claims, 20 Drawing Sheets

(58) Field of Classification Search
USPC ............................................ 200/501; 335/20
See application file for complete search history.

(56) References Cited

U.S. PATENT DOCUMENTS

| | | | | |
|---|---|---|---|---|
| 9,865,415 | B2 | 1/2018 | Mittelstadt | |
| 10,852,326 | B2 | 12/2020 | Fleege et al. | |
| 11,501,929 | B1 * | 11/2022 | Fleege | H01H 3/26 |
| 2006/0071742 | A1 * | 4/2006 | Castonguay | H01H 89/08<br>335/20 |
| 2009/0167100 | A1 | 7/2009 | Brown et al. | |

* cited by examiner

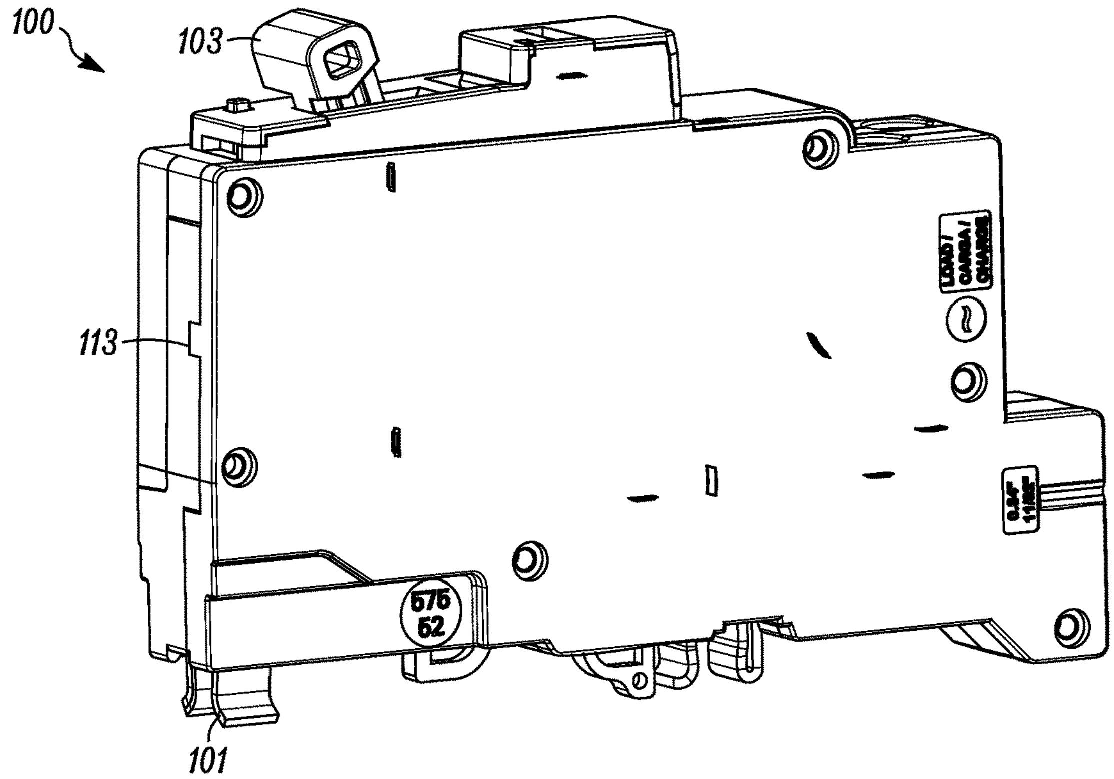
FIG. 1A1
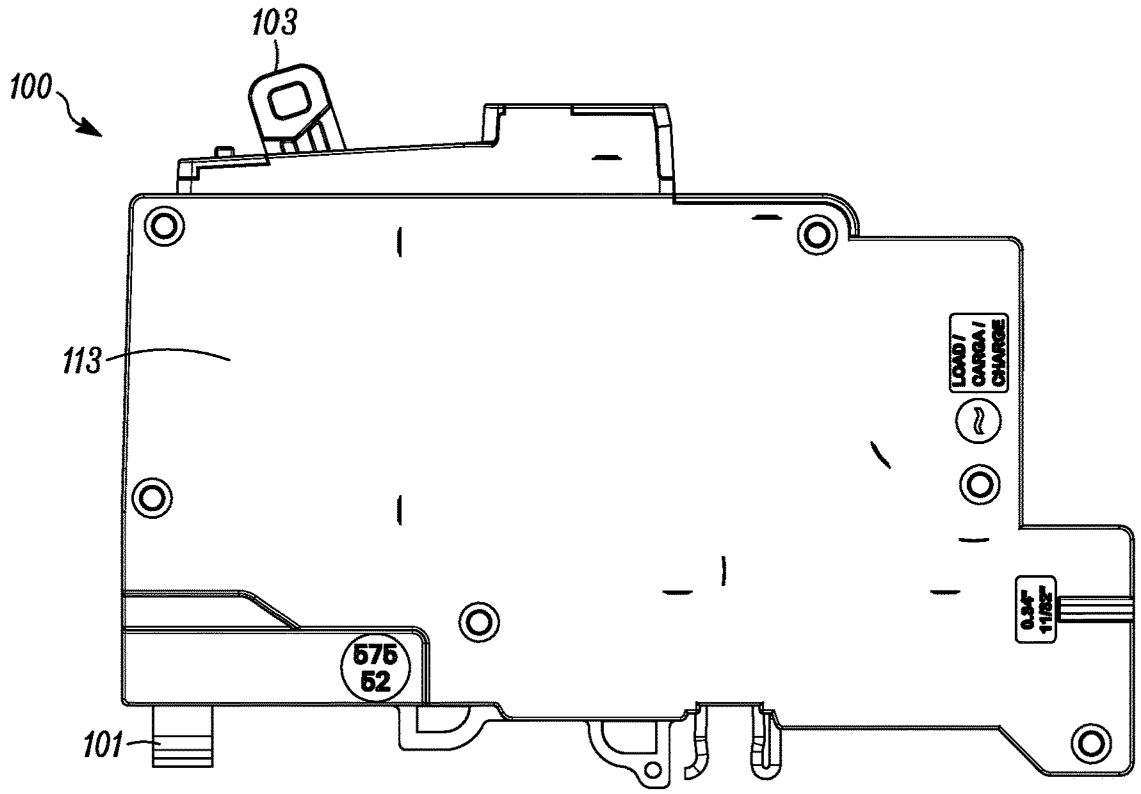
FIG. 1A2

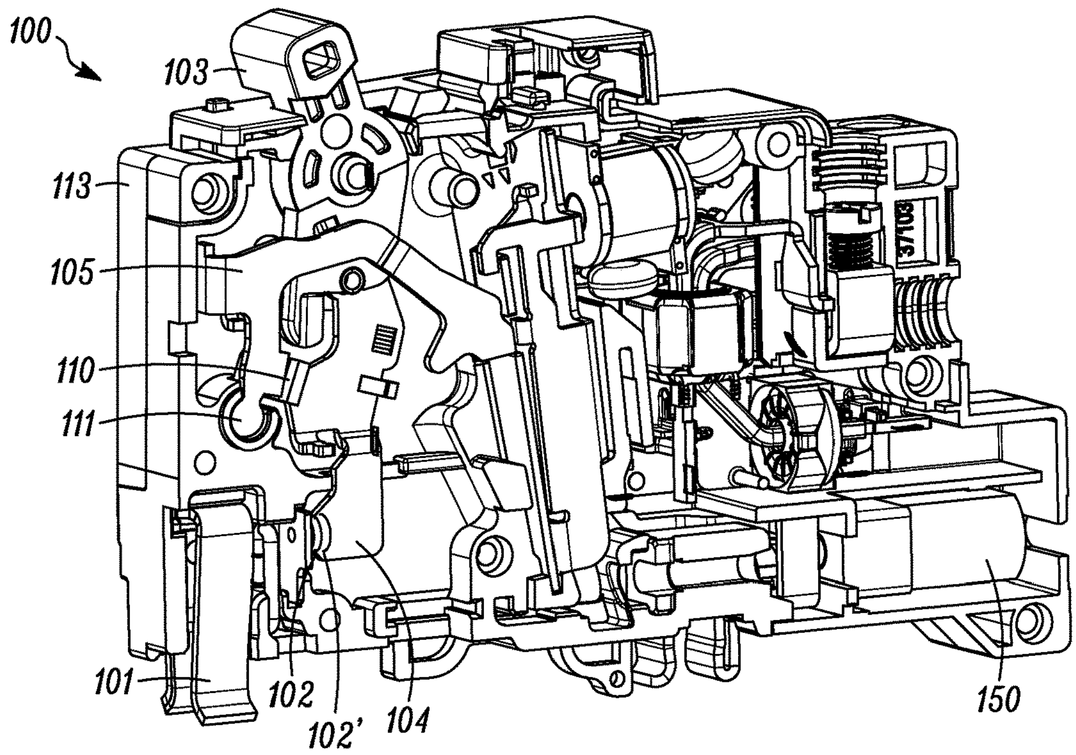
FIG. 1B1
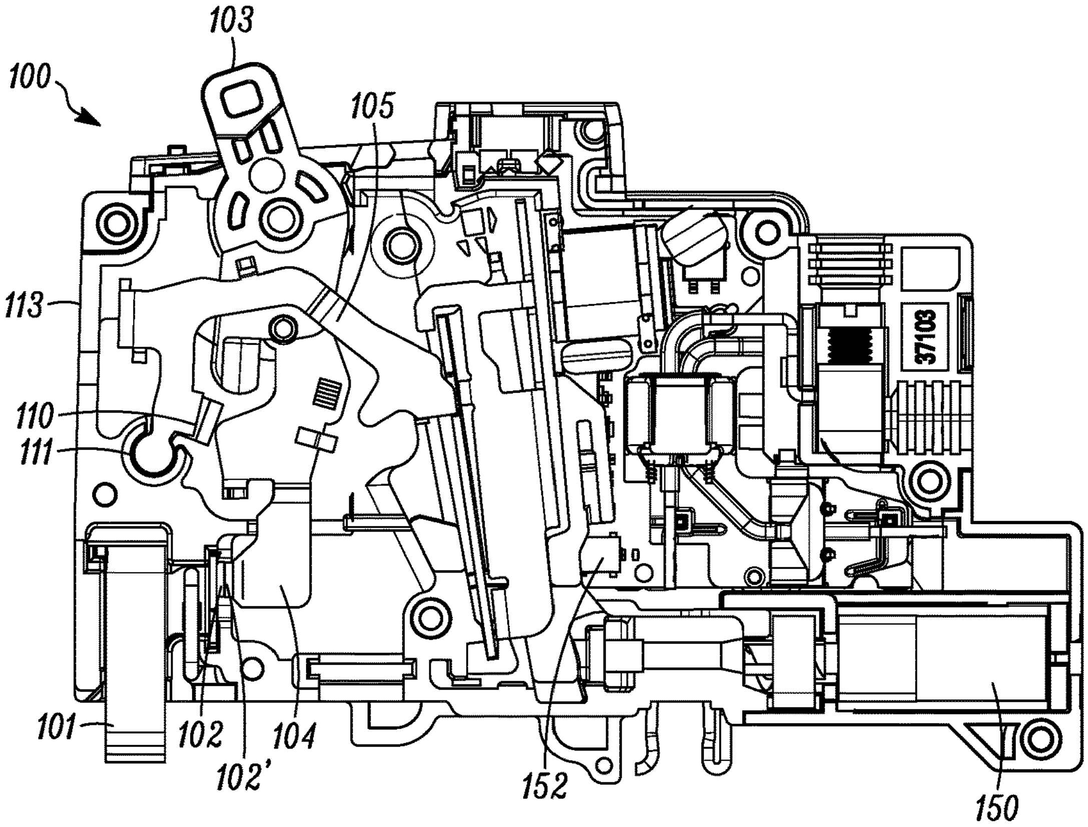
FIG. 1B2

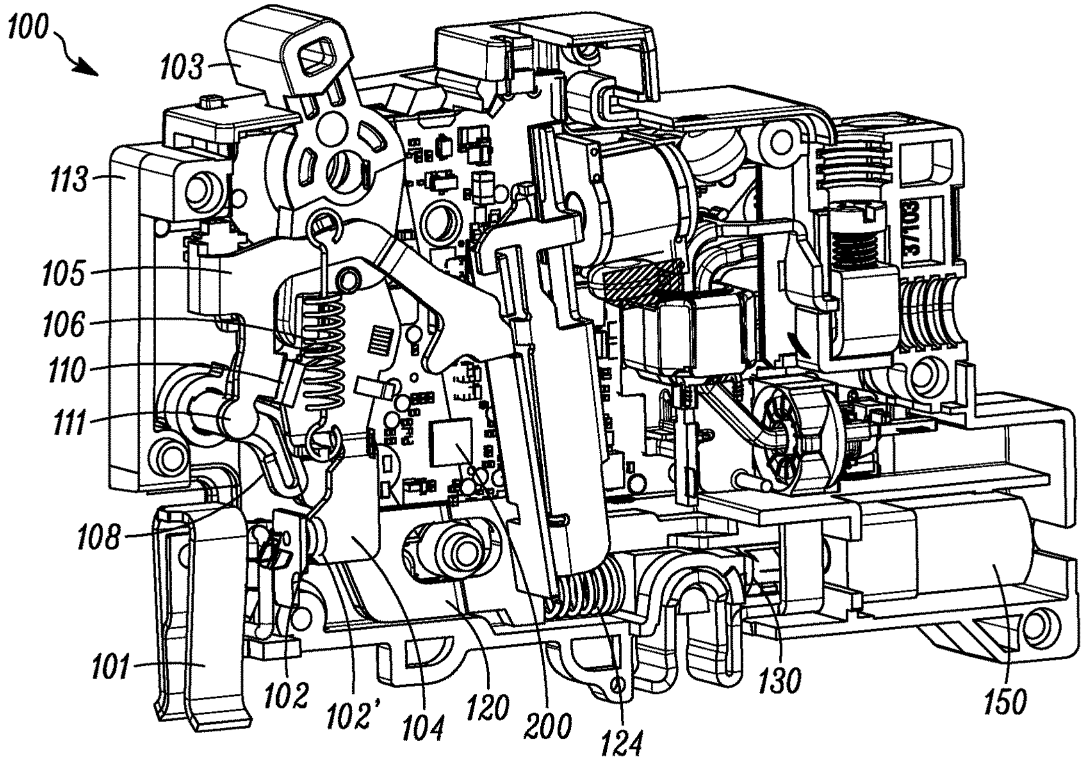
FIG. 1C1
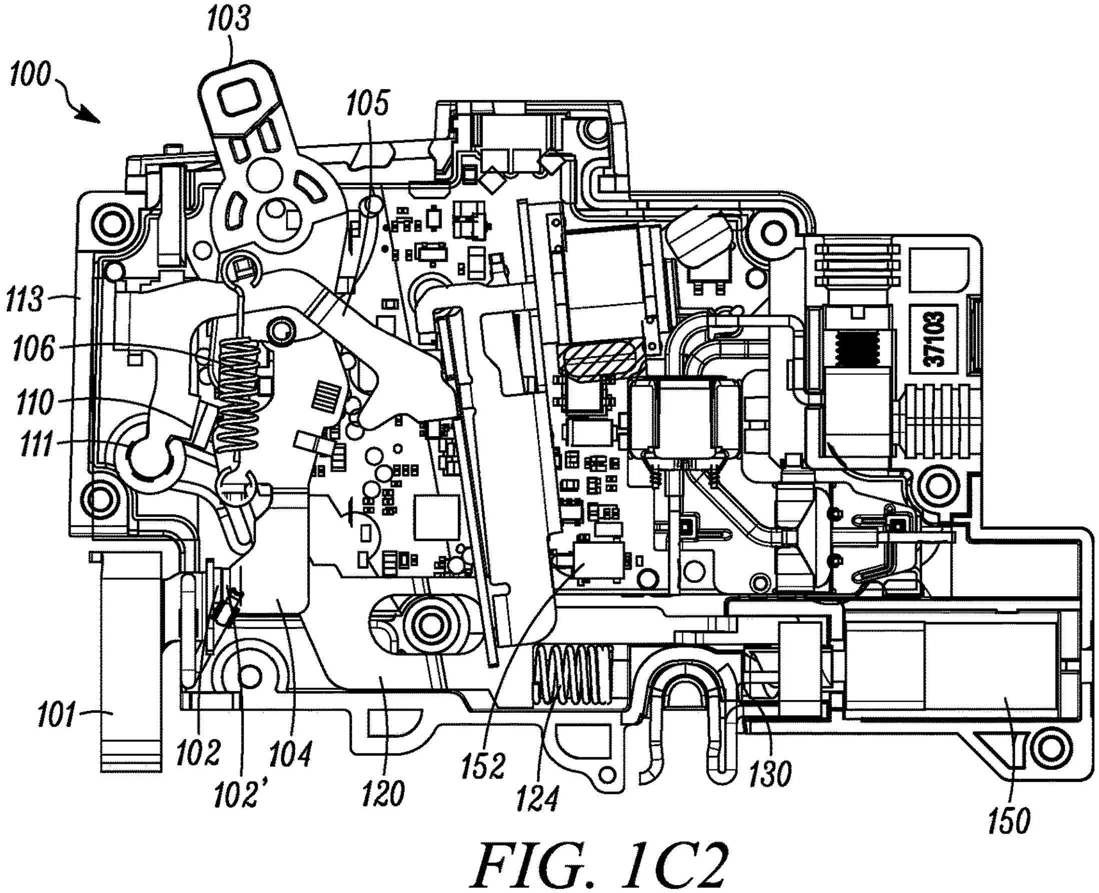
FIG. 1C2

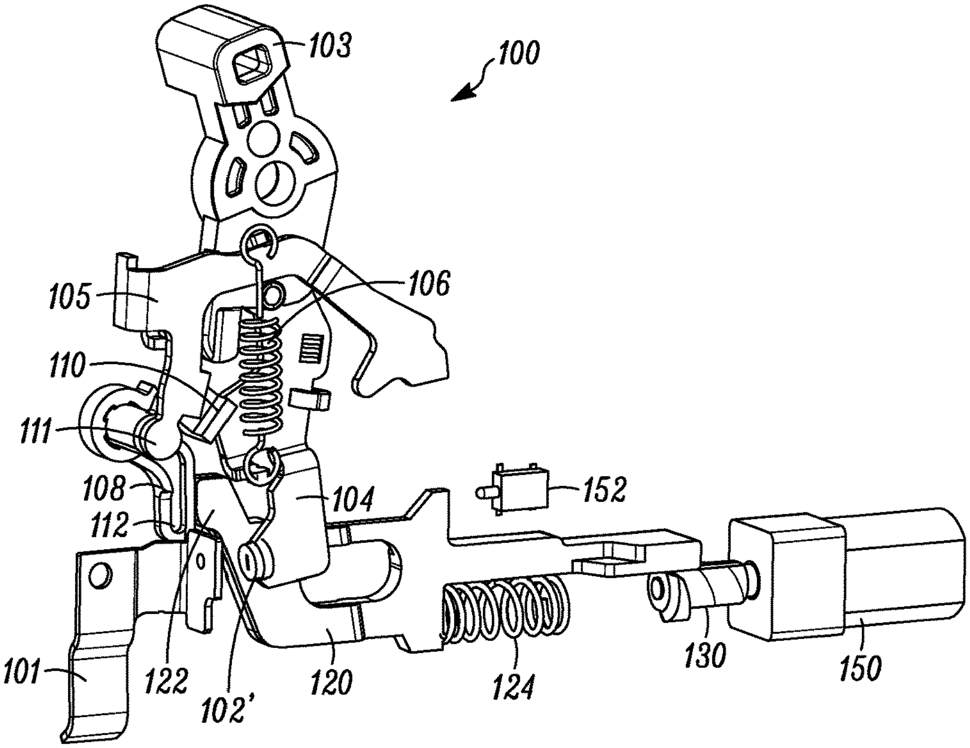
FIG. 2A1
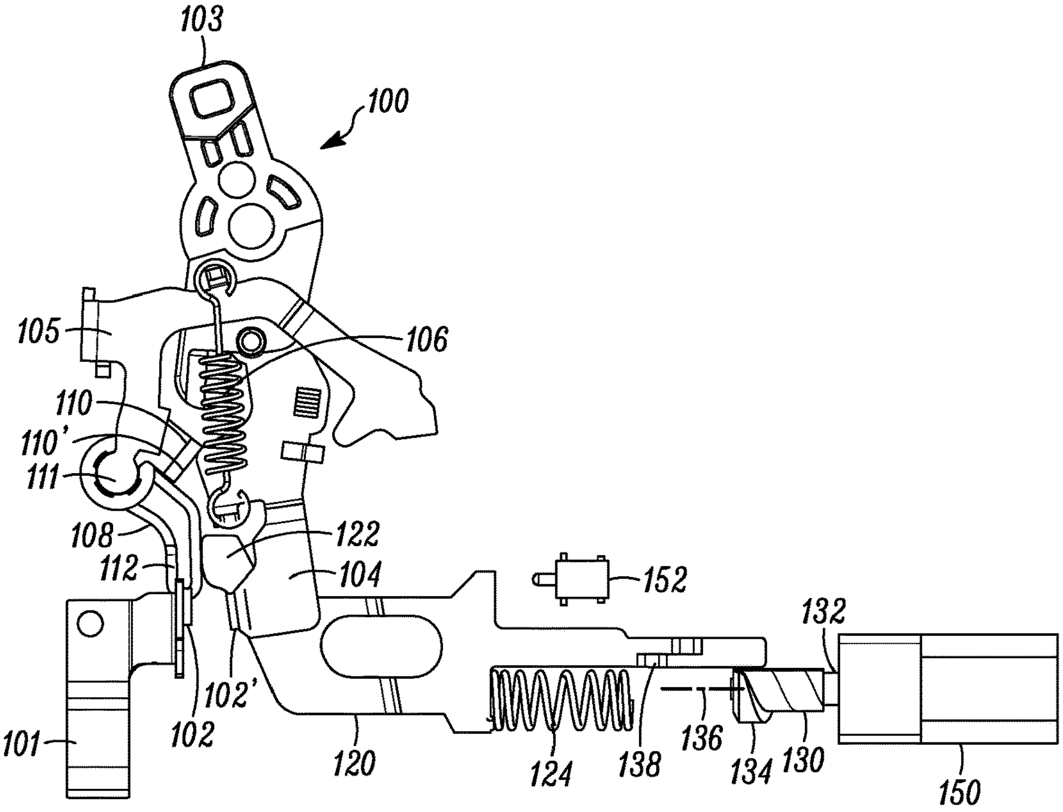
FIG. 2A2

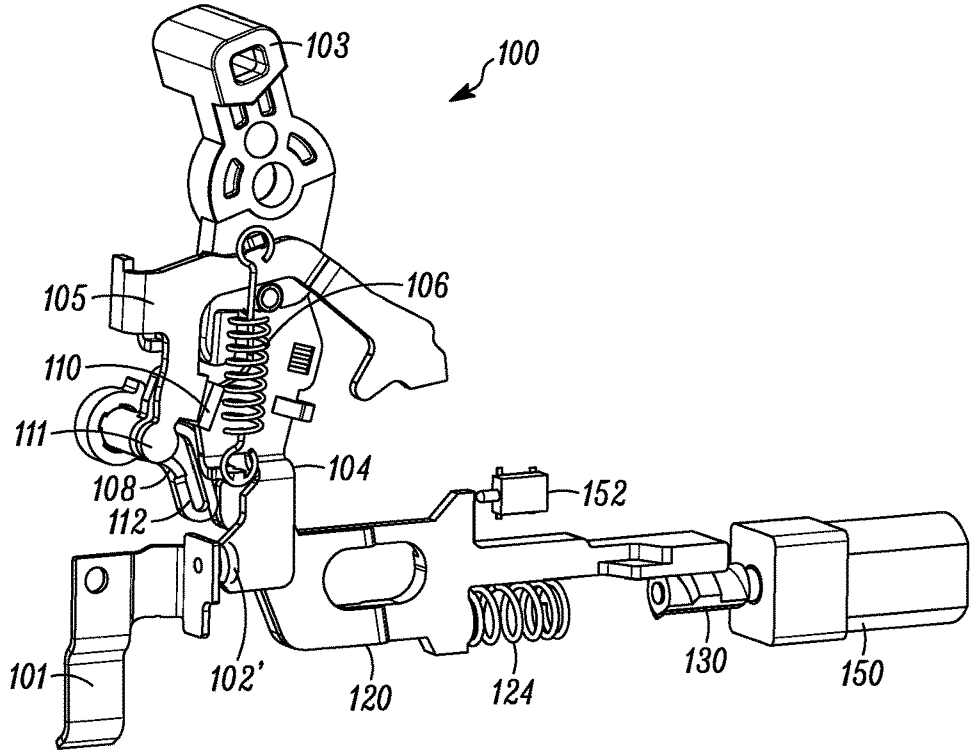
FIG. 2B1
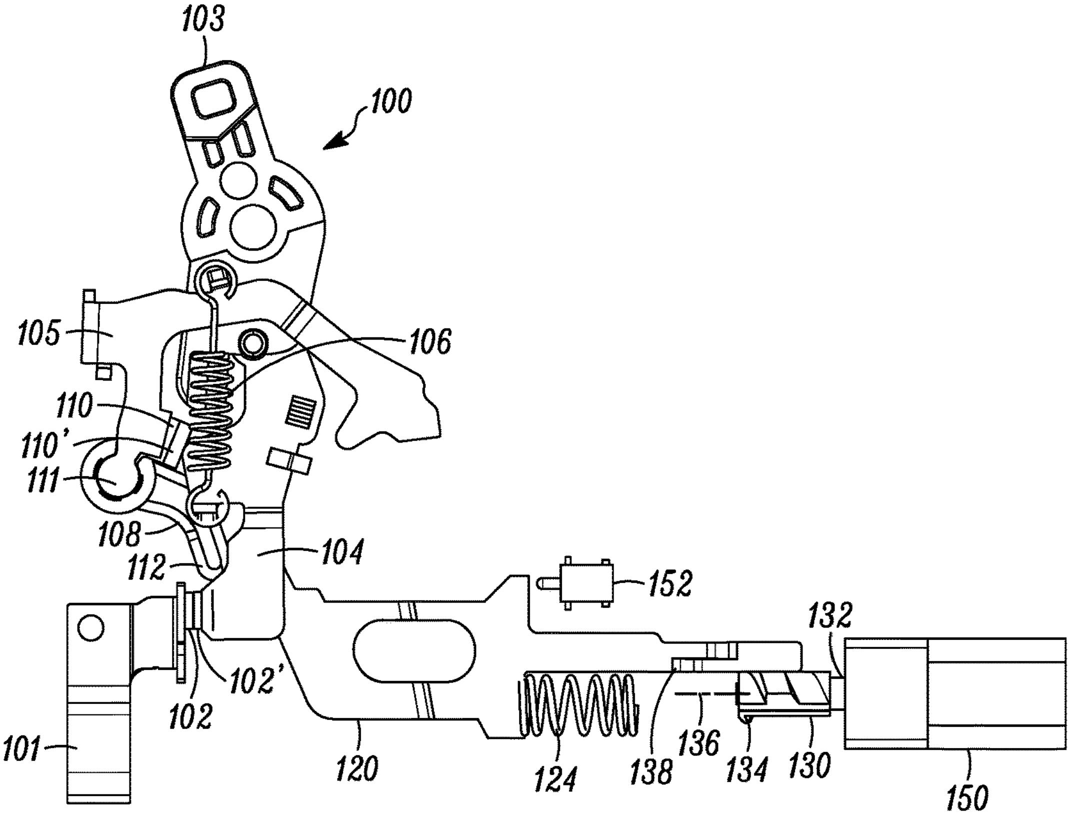
FIG. 2B2

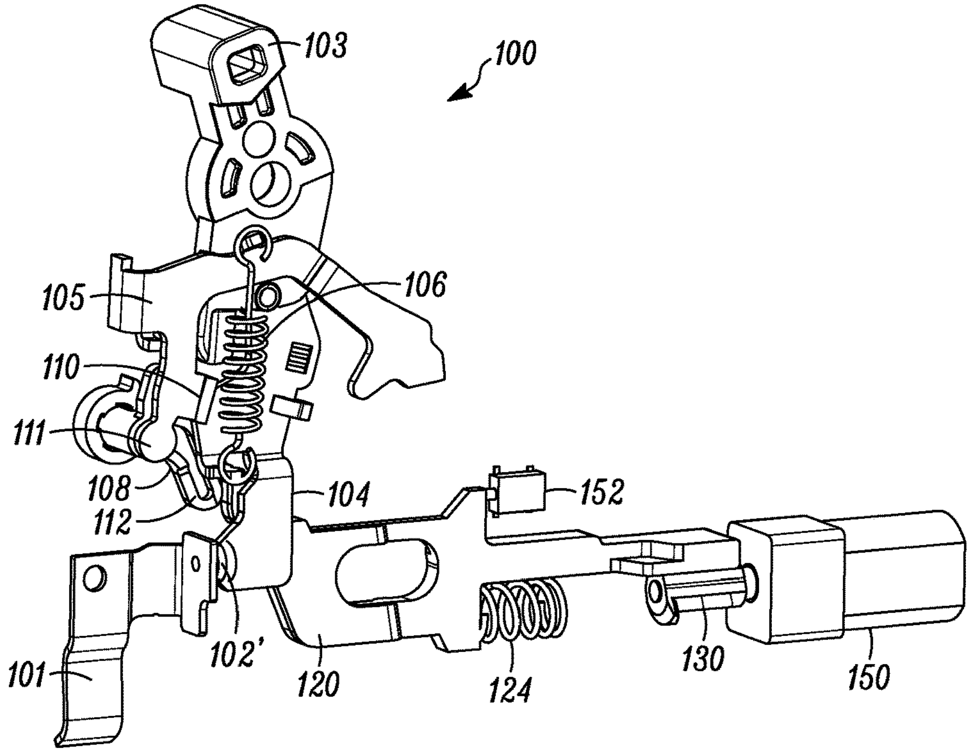
FIG. 2C1
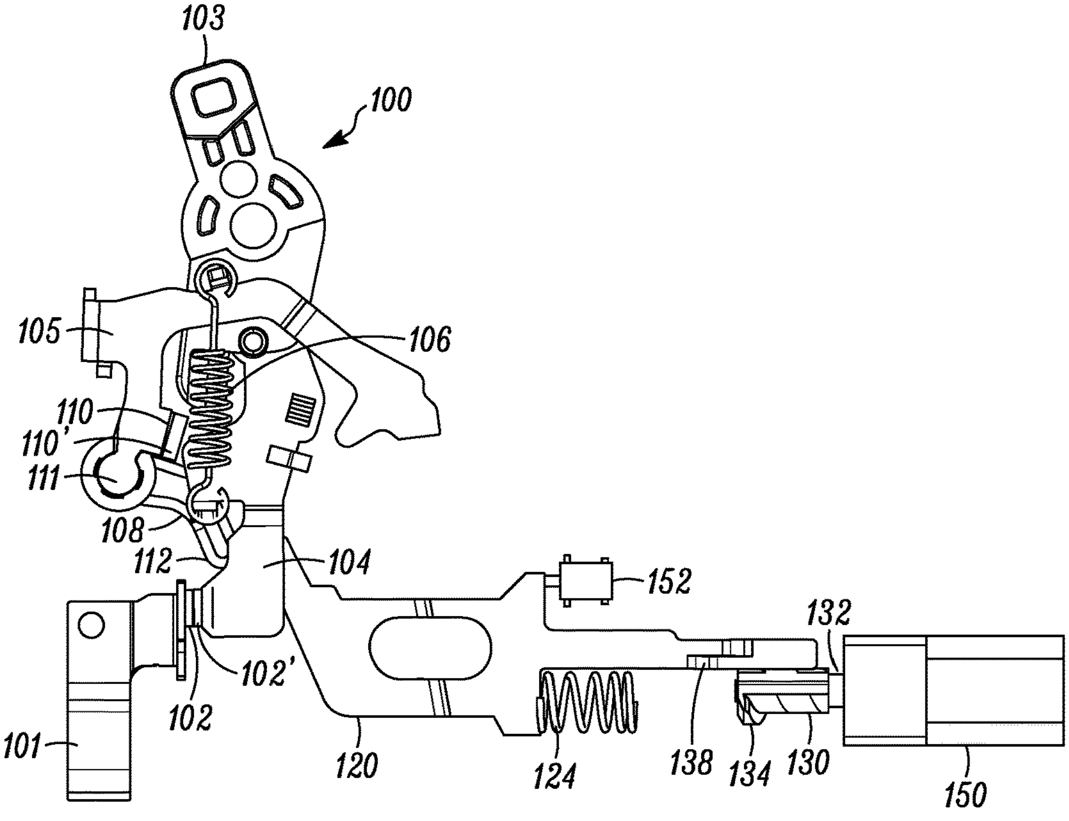
FIG. 2C2

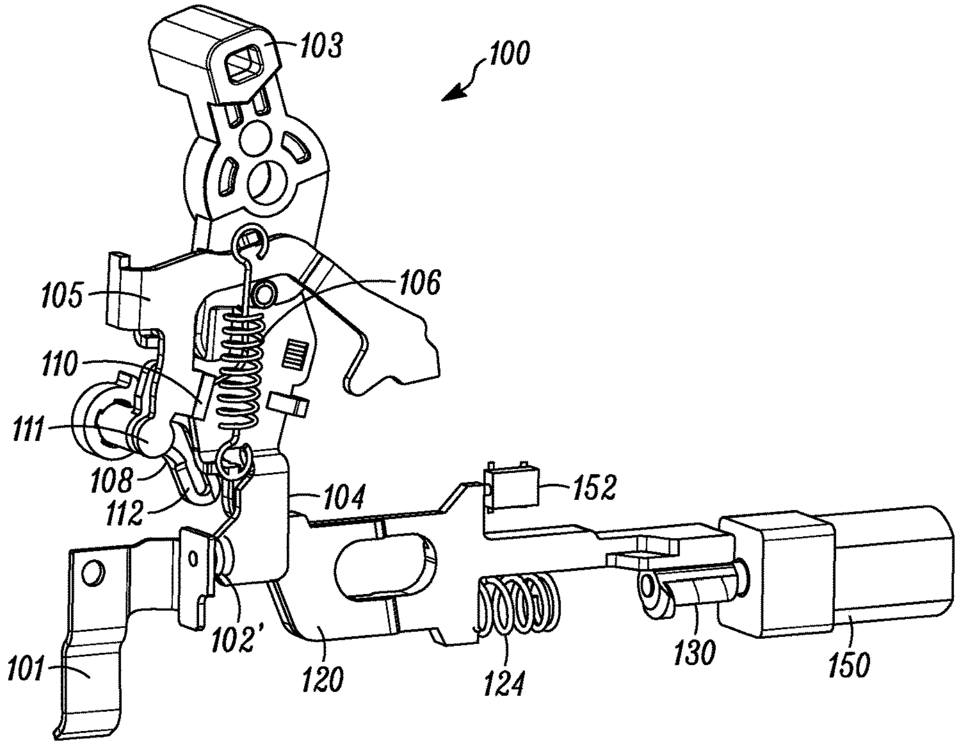
FIG. 2D1
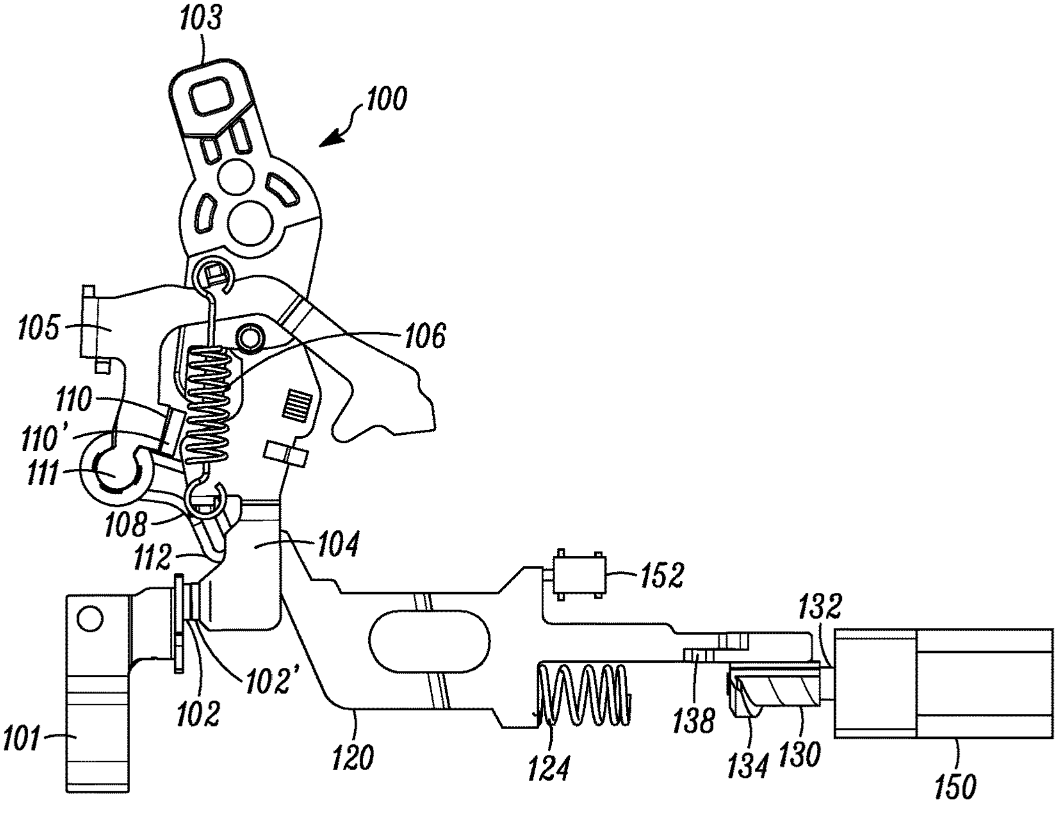
FIG. 2D2

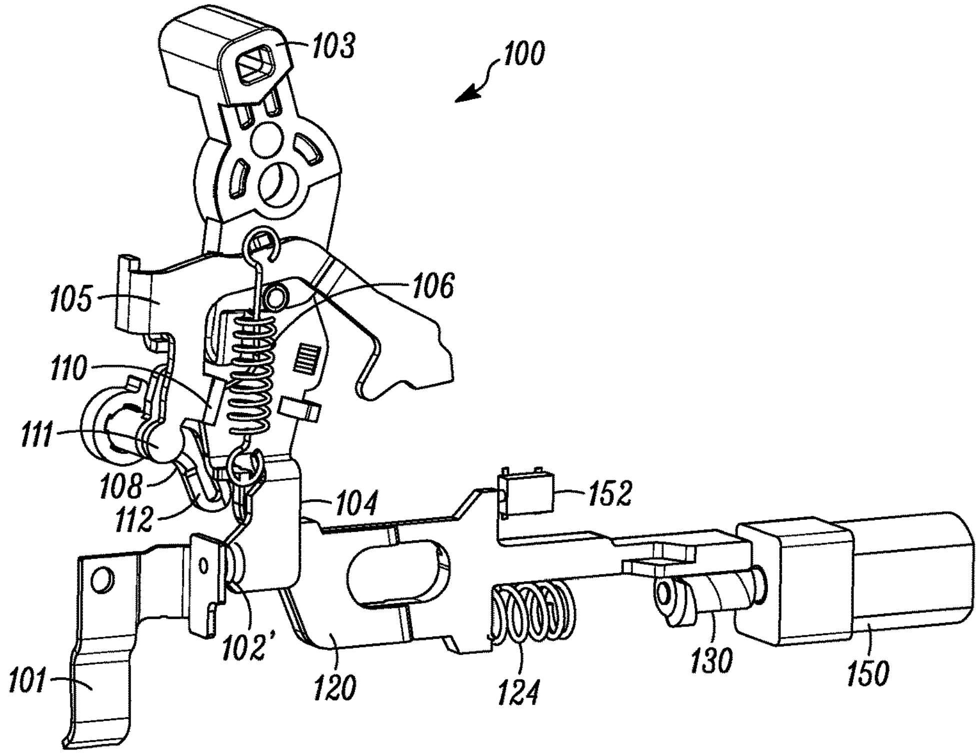
FIG. 2E1
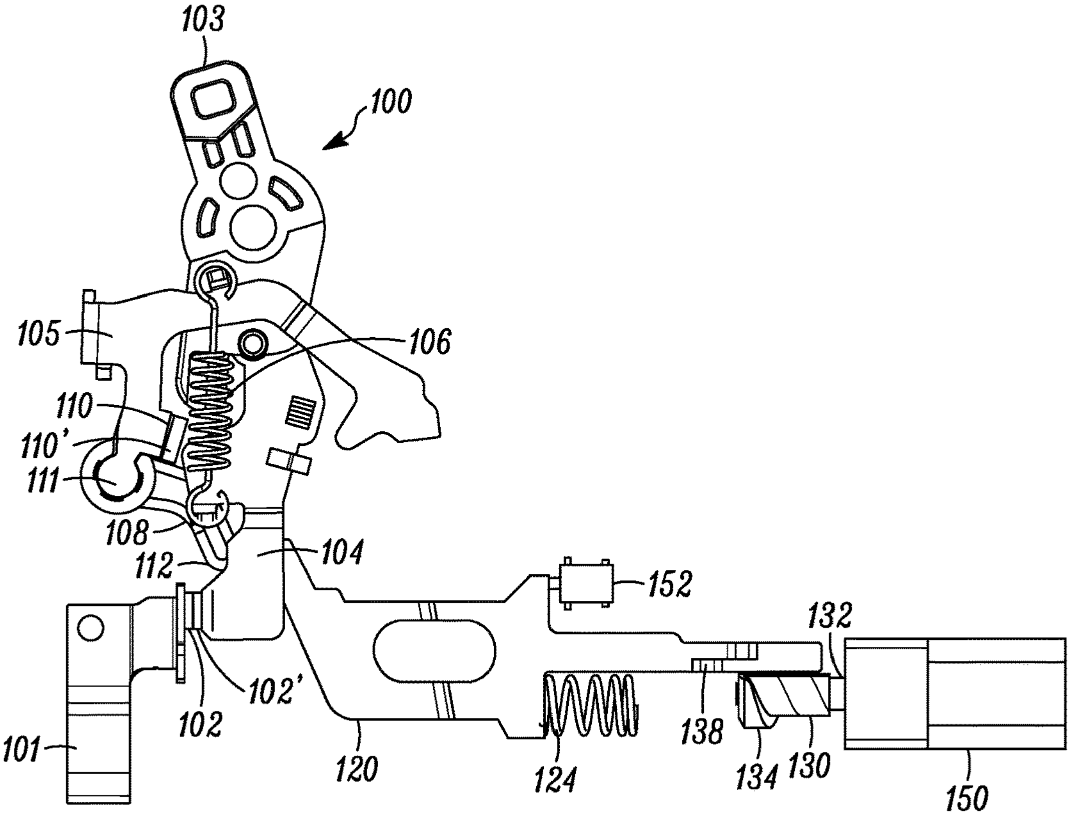
FIG. 2E2

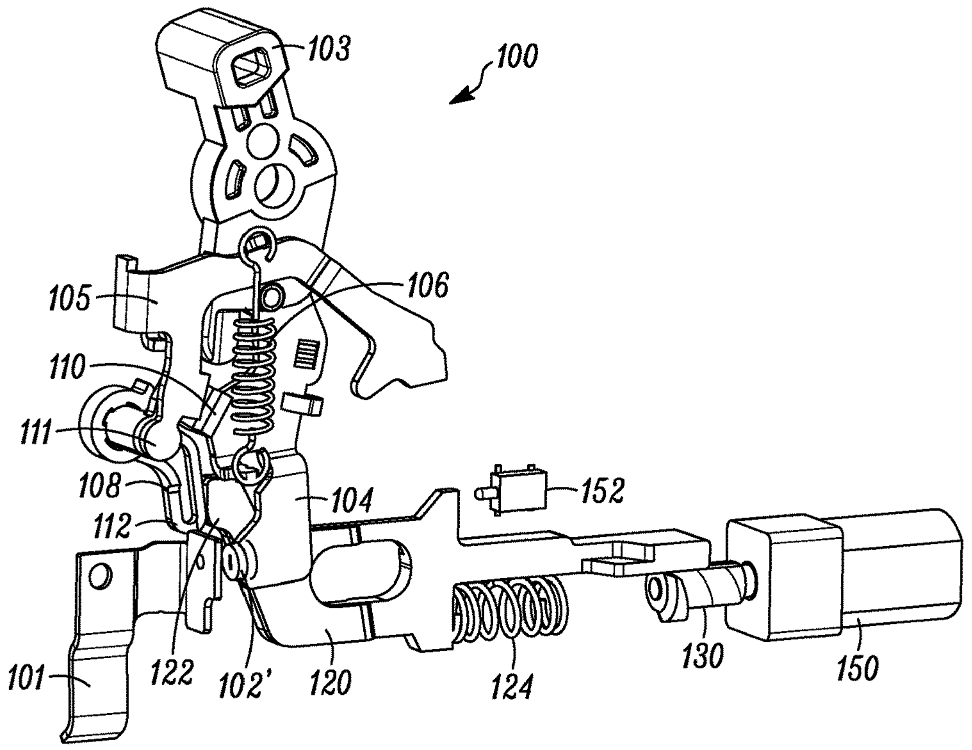
FIG. 2F1
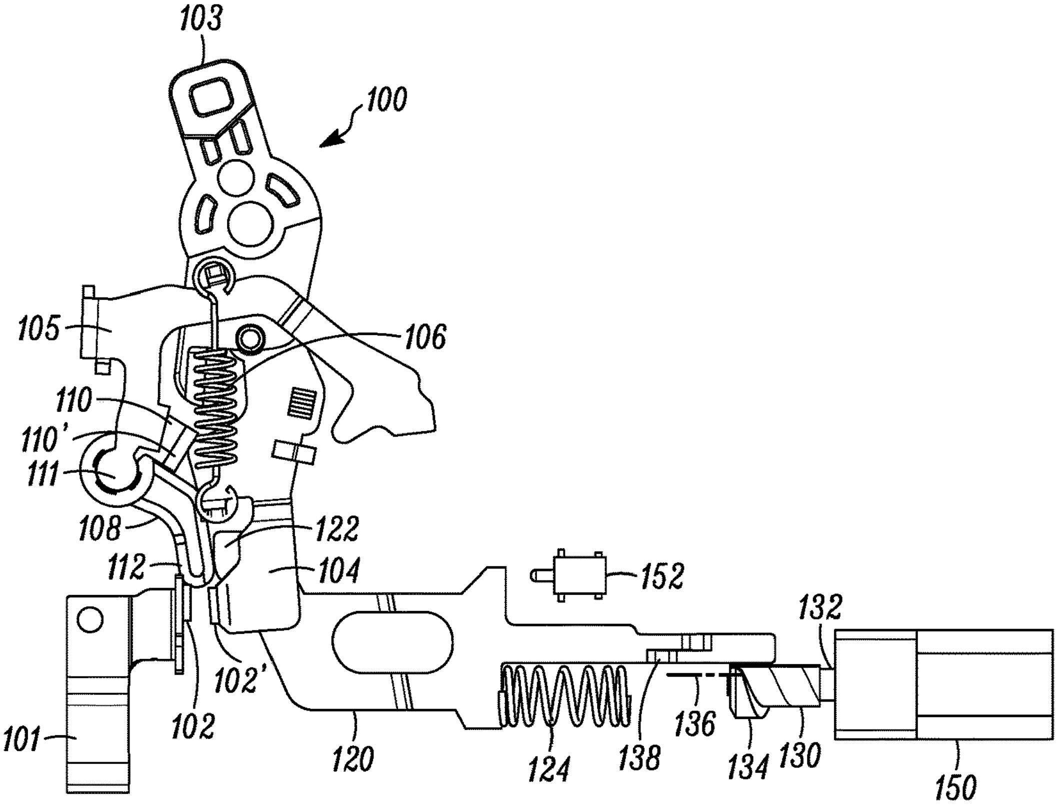
FIG. 2F2

REMOTE CONTROLLED MINIATURE CIRCUIT BREAKER WITH HELICAL GEAR AND DC MOTOR

CROSS REFERENCE TO RELATED APPLICATIONS

This application is a continuation of U.S. patent application Ser. No. 17/353,888, filed on Jun. 22, 2021, the contents of which are incorporated by reference herein in their entirety.

TECHNICAL FIELD

This invention is directed generally to circuit breakers and, more particularly, to remote control of a miniature circuit breaker to connect or disconnect electrical power to a branch circuit.

BACKGROUND

Circuit breakers are conventionally used to protect electric power distribution circuits against arcing faults, ground faults, short circuit faults, and/or overloads. Typically, miniature circuit breakers are used particularly to protect branch circuits in homes and in commercial and light industry applications. Banks of miniature circuit breakers are typically arranged in an electrical panel for manual switching of power to respective branch circuits. When an electrical utility outage occurs, critical loads such as pumps, security systems, refrigerators and electronics should ideally have an auxiliary source of power available. In residential and in commercial and light industry applications, back-up generators or photovoltaic systems with battery back-up are available to provide limited auxiliary power, which is typically at a lower power level than is available from the utility. When a utility outage occurs, some means is required to switch the reduced auxiliary power to the critical loads. A homeowner or manager of a commercial or light industry facility may be located at some distance from the power switching panels and may need to travel to the site of the panels to manually switch over to the auxiliary power.

When a major power outage occurs for an electrical utility, such as due to a severe weather event, the utility may have to impose controlled rolling cutoffs of electric service in an area by area sequence, because the demand for power in the region overwhelms the available generation. Such controlled rolling cutoffs, even for a few hours in each affected area, imposes a total blackout to each home or business and a risk to critical loads during the length of the outage. The ability of the electrical utility to remotely provide limited reserve power to branch circuits connected to critical loads in homes or businesses, would mitigate the damage typically incurred from controlled rolling cutoffs.

What is needed, therefore, is a way to remotely control a miniature circuit breaker to connect or disconnect electrical power to a branch circuit.

SUMMARY

In accordance with one example embodiment described herein, a remote controlled miniature circuit breaker includes a helical gear configured to engage with mating teeth of a slider plate coupled to the main contacts of the circuit breaker, the helical gear including a flat portion configured to allow the sliding plate to slide past helical gear. A unidirectional motor mounted in the circuit breaker, is configured to respond to an external control signal to the close the main contacts, to drive the helical gear in a unidirectional rotation while the helical gear engages the mating teeth of the slider plate, thereby moving the slider plate to close the main contacts. The motor is configured to respond to an external control signal to open the main contacts, to resume the unidirectional rotation of the helical gear to position the flat portion of the helical gear to allow the slider plate to slide past the helical gear, to thereby open the main contacts.

In accordance with one example embodiment described herein, a remote controlled miniature circuit breaker, comprises:

- a slider plate slidably mounted in the circuit breaker, configured to open and close main contacts of the circuit breaker, in response to the slider plate sliding respectively toward or away from the main contacts;
- a helical gear mounted on a rotary shaft in the circuit breaker, configured to engage teeth of the helical gear with mating teeth of the slider plate, the teeth of the helical gear extending circumferentially about a first portion of the circumference of the helical gear, the helical gear including a flat portion that does not have gear teeth, the flat surface configured to not engage the mating teeth of the slider plate;
- a unidirectional motor mounted in the circuit breaker, configured to drive the helical gear in a unidirectional rotation during the first portion of the circumference of the helical gear when it is engaging mating teeth of the slider plate, to thereby pull the slider plate away from the main contacts, to thereby close main contacts of the circuit breaker, in response to an external signal to the close main contacts of the circuit breaker;
- a compression spring mounted in the circuit breaker, configured to apply a compression spring bias against motion of the slider plate as it is pulled by the helical gear away from the main contacts;
- an electrical position switch mounted in the circuit breaker monitored by a microcontroller in the circuit breaker, the switch configured to engage and be activated by the motion of the slider plate to stop the unidirectional rotation of the motor while the main contacts are in the closed position and the teeth in the first portion of the circumference of the helical gear are engaged with the mating teeth of the slider plate; and
- wherein the electrical position switch is configured to respond to an external signal to open the main contacts, by energizing the motor to resume the unidirectional rotation of the helical gear to position the flat portion to not engage the mating teeth of the slider plate, to release the slider plate to slide past the helical gear in response to the compression spring bias, thereby forcing the slider plate to move toward the main contacts to open the main contacts.

The resulting apparatus and system enables remote control of a miniature circuit breaker to connect or disconnect electrical power to a branch circuit.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 1A1 is a perspective view and FIG. 1A2 is a side view of the overall outside appearance of a remote controlled miniature circuit breaker 100, according to an example embodiment of the disclosure.

FIG. 1B1 is a perspective view and FIG. 1B2 is a side view of the overall inner organization of the miniature circuit breaker 100 with the cover removed, according to an example embodiment of the disclosure.

FIG. 1C1 is a perspective view and FIG. 1C2 is a side view of the overall inner organization of the miniature circuit breaker 100 with the cover and middle wall removed, according to an example embodiment of the disclosure.

FIG. 2A1 is a perspective view and FIG. 2A2 is a side view of the inner organization of the components of the miniature circuit breaker 100, with the main contacts open in response to the slider plate positioned fully away from the motor and depressing the kicker lever, according to an example embodiment of the disclosure.

FIG. 2B1 is a perspective view and FIG. 2B2 is a side view of the inner organization of the components of the miniature circuit breaker 100, with the main contacts having just closed in response a remote controlled signal to close the main contacts by energizing the motor to begin to pull the slider plate closer to the motor and releasing the kicker lever, according to an example embodiment of the disclosure.

FIG. 2C1 is a perspective view and FIG. 2C2 is a side view of the inner organization of the components of the miniature circuit breaker 100, with the main contacts closed and the button of the logic switch beginning to be contacted by the slider plate in response to the motor further pulling the slider plate closer to the motor, and a gap is now present between the kicker lever and slider plate, according to an example embodiment of the disclosure.

FIG. 2D1 is a perspective view and FIG. 2D2 is a side view of the inner organization of the components of the miniature circuit breaker 100, with the main contacts closed, the logic switch activated, and the compression spring fully compressed in response to the motor pulling the slider plate fully close to the motor, according to an example embodiment of the disclosure.

FIG. 2E1 is a perspective view and FIG. 2E2 is a side view of the inner organization of the components of the miniature circuit breaker 100, with the main contacts closed and a remote controlled signal received to open the main contacts by energizing the motor, the helical gear rotates the flat side to disengage the slider plate to allow the compression spring to propel the slider plate away from the motor and toward the kicker lever to depress the kicker lever, according to an example embodiment of the disclosure.

FIG. 2F1 is a perspective view and FIG. 2F2 is a side view of the inner organization of the components of the miniature circuit breaker 100, with the main contacts reopened in response to the slider plate having been propelled by the compression spring away from the motor and depressing the kicker lever, according to an example embodiment of the disclosure.

FIG. 6A shows the state of main contacts closed, handle ON, trip lever and kicker lever in ON. FIG. 6B shows the state of main contacts open from remote control, handle in ON, trip lever in ON, kicker lever open, and toggle spring slightly rotated to follow blade. FIG. 6C shows the state of main contacts fully open from trip event, trip lever and kicker lever in TRIPPED, handle in TRIPPED, main toggle spring in TRIPPED, with the first end of the kicker lever remaining flush against the trip lever that is being pushed by the first end of the kicker lever, thereby pushing against the blade in response to a trip event, according to an example embodiment of the disclosure.

DETAILED DESCRIPTION

Figure 3A:
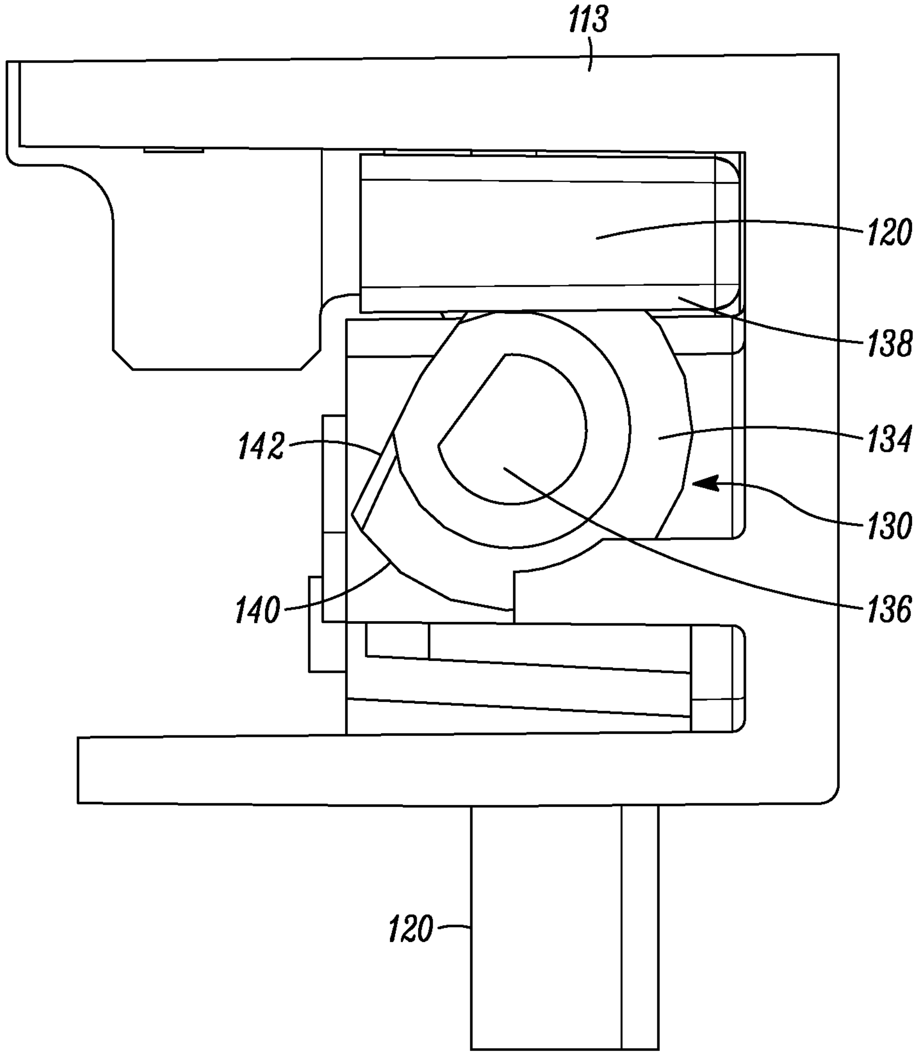
FIG. 3A is an end view of the helical gear engaged with the slider plate to pull the slider plate as the helical gear is rotated by the motor, further pulling the slider plate closer to the motor, according to an example embodiment of the disclosure.

FIG. 1A1 is a perspective view and FIG. 1A2 is a side view of the overall outside appearance of a remote controlled miniature circuit breaker 100, including the housing 113, handle 103 and line terminal 101. The line terminal 101 connects the circuit breaker to utility line voltage. FIG. 1B1 is a perspective view and FIG. 1B2 is a side view of the overall inner organization of the miniature circuit breaker 100 with the cover removed, according to an example embodiment of the disclosure.

FIG. 1C1 is a perspective view and FIG. 1C2 is a side view of the overall inner organization of the remote controlled miniature circuit breaker 100 of FIGS. 1A1, 1A2. A blade 104 is pivotally mounted to the handle 103 in the miniature circuit breaker housing 113, having a moveable main electrical contact 102' that is aligned with a stationary main electrical contact 102 mounted in the housing 113. The blade 104 is spring biased by a toggle spring 106 to pivot from an open position FIGS. 2A1, 2A2 for the main contacts 102, 102' to a closed position FIGS. 2B1, 2B2 for the main contacts 102, 102'. The blade 104 is pivotally mounted on the handle 103 to enable manual switching of the main contacts 102, 102'.

A kicker lever 108 is pivotally mounted on the pivot 111 in the housing and shares the same pivotal mounting 111 with the trip lever 105. In a miniature circuit breaker without the remote control function of an example embodiment of the disclosure, a trip lever 105' (FIG. 4A) includes a transverse tab 105" that performs a kicker function to knock the blade 104 from the closed position to the open position of the main contacts in response to a trip event.

In accordance with an example embodiment of the disclosure, the kicker function is broken out into a trip function that is activated to open the contacts in response to a trip event. The separate, remote control function to open the main contacts in response to an external control signal, is enabled by the kicker lever 108 of an example embodiment of the disclosure.

In an example embodiment of the disclosure, the kicker lever 108 has a first end 110 and a second end 112 on opposite sides of the pivotal mounting 111 of the kicker lever 108 (FIG. 5C), with a transverse surface 110' (FIG. 2A2) on the first end 110 thereof configured to push or kick the blade 104 against the toggle spring 106 bias. When the main contacts 102, 102' are in the open position FIGS. 2A1, 2A2, if the kicker lever 108 rotates counterclockwise about its pivot 111, the transverse surface 110' of the kicker lever 108 relieves pressure on the blade 104, and the blade 104 is forced by the toggle spring 106 bias to the closed position FIGS. 2B1, 2B2 for the main contacts 102, 102'.

A slider plate 120 is slidably mounted in the housing 113, and has an end surface 122 configured to push against the second end 112 of the kicker lever 108 to open the main contacts 102, 102' (FIG. 2A2), when the slider plate 120 moves toward the left, as shown in transitioning from the closed position in FIGS. 2E1, 2E2 to the open position in FIGS. 2F1, 2F2. When the end surface 122 of the slider plate 120 pushes the second end 112 of the kicker lever 108, the kicker lever 108 is caused to pivotally rotate clockwise about its pivotal mounting 111, to thereby push the transverse surface 110' of the first end 110 of the kicker lever 108 against the blade 104 to push or kick the blade 104 against the toggle spring 106 bias, thereby moving the main contacts 102, 102' from the closed position FIGS. 2E1, 2E2 to the open position FIGS. 2F1, 2F2. To summarize, in response to an external control signal to open the main contacts, the kicker lever 108 rotates clockwise about the pivot 111, and applies a force or a kick to the blade 104 to rotate the blade counter clockwise to open the main contacts 102, 102' and interrupt the flow of current.

To close the main contacts 102, 102', as shown in transitioning from the open position in FIGS. 2A1, 2A2 to the closed position in FIGS. 2B1, 2B2, the slider plate 120 moves toward the right and relieves pressure on the second end 112 of the kicker lever 108. In response, the kicker lever 108 rotates counterclockwise about its pivot 111, the transverse surface 110' of the kicker lever 108 relieves pressure on the blade 104, but the transverse surface 110' remains in contact with the blade, and the blade 104 is forced by the toggle spring 106 bias to the closed position FIGS. 2B1, 2B2 for the main contacts 102, 102'. The motion of the transverse surface 110' of the kicker lever 108 follows the spring-biased motion of the blade 104. To summarize, the kicker lever 108 rotates counterclockwise about the pivot 111, the blade 104 follows the kicker lever 108 in clockwise rotation until the main contacts 102, 102' are touching and current flows through the contacts.

A helical gear 130 is mounted on a rotary shaft 132 in the housing 113, having an axis 136, configured to engage helical teeth 134 of the gear 130 with mating helical teeth 138 of the slider plate 120. The helical teeth 134 of the helical gear 130 extend circumferentially about a first portion 140 (FIG. 3A) of the circumference of the helical gear 130.

A compression spring 124 is mounted in the housing 113, configured to apply a compression spring 124 bias against the slider plate 120 to urge the end surface 122 of the slider plate 120 toward the left in FIGS. 2F1, 2F2, toward the second end 112 of the kicker lever 108.

A unidirectional motor 150 is mounted in the housing 113, configured to drive the helical gear 130 in a unidirectional rotation during the first portion 140 of the circumference of the helical gear 130 when it is engaging the mating helical teeth 138 of the slider plate 120. When an external control signal is applied to close the main contacts 102, 102', shown in FIGS. 2B1, 2B2, the motor 150 is thereby energized to rotate the rotary shaft 132 in the unidirectional rotation. The helical gear 130 begins to rotate and cause the slider plate 120 to begin moving the end surface 122 of the slider plate 120 toward the right, away from the second end 112 of the kicker lever 108. In response the slider plate 120 moves toward the right and relieves pressure on the second end 112 of the kicker lever 108. In response, the kicker lever 108 rotates counterclockwise about its pivot 111, the transverse surface 110' of the kicker lever 108 relieves pressure on the blade 104, and the blade 104 is forced by the toggle spring 106 bias to the closed position of FIGS. 2B1, 2B2 for the main contacts 102, 102'. As the slider plate 120 moves toward the right, toward the motor 150, the compression spring 124 is compressed. The motor 150 may be a direct current (DC) motor. The output torque of the motor 150 applied to the helical gear 130 may be increased by means of a reduction gear arrangement connected between the output shaft of the motor 150 and the helical gear 130.

An electrical position switch 152 mounted in the housing 113 is connected to a microcontroller 200 (FIG. 1C1) in the circuit breaker. The switch 152 is configured to engage and be activated by the motion of the slide plate 120 as it moves toward the motor 150. When fully activated, the switch 152 signals the microcontroller to stop the unidirectional rotation of the motor 150 when the main contacts 102, 102' have reached a desired closed position as shown in FIGS. 2D1, 2D2 during the first portion 140 of the circumference of the helical gear 130 engaging the mating helical teeth 138 of the slider plate 120.

FIGS. 2C1, 2C2 show the main contacts 102, 102' closed and the switch 152 beginning to be contacted by the slider plate 120 in response to the motor 150 further pulling the slider plate 120 toward the right and closer to the motor 150.

FIGS. 2D1, 2D2 show the main contacts 102, 102' closed, the switch 152 activated, and the compression spring 124 fully compressed in response to the motor 150 pulling the slider plate 120 fully toward the right, close to the motor.

Figure 3B:
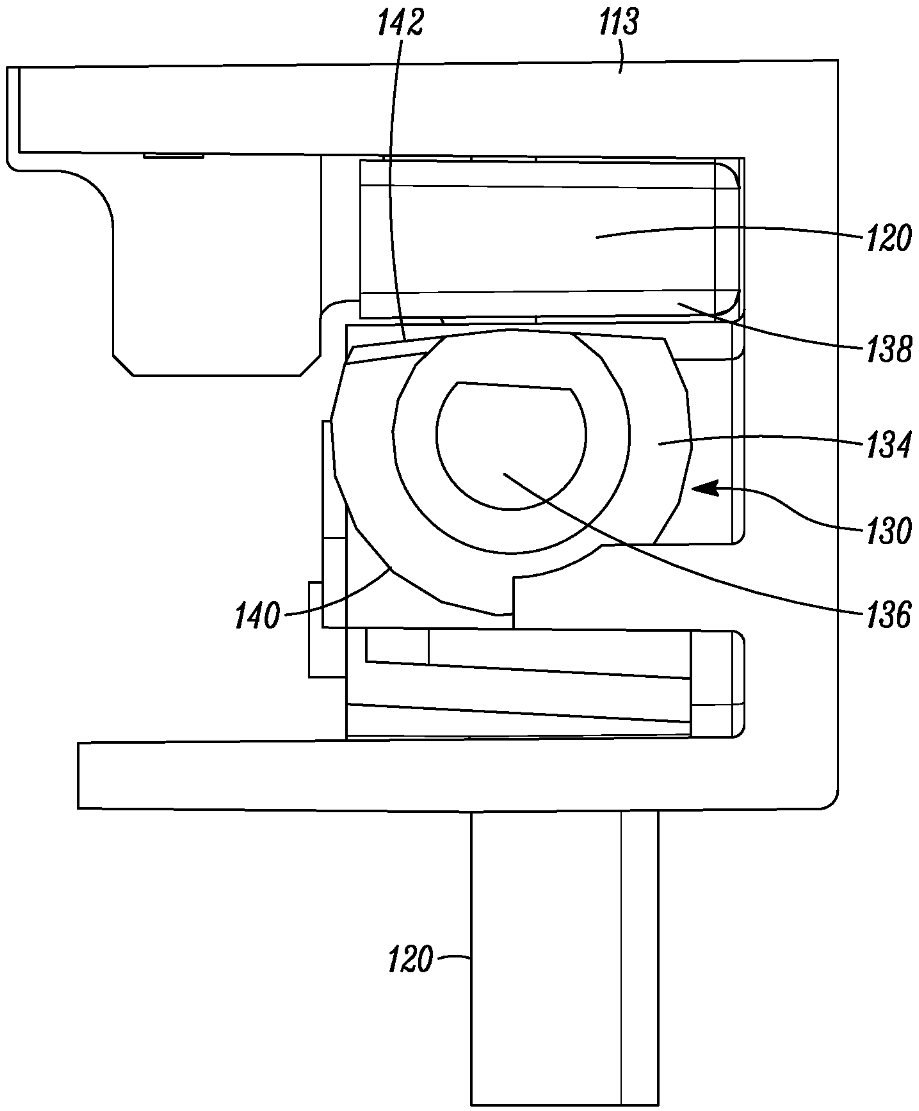
FIG. 3B is an end view of the helical gear disengaged from the slider plate to allow the compression spring to propel the slider plate away from the motor and toward the kicker lever, according to an example embodiment of the disclosure.

The helical gear 130 includes a flat portion 142 (FIG. 3A) parallel to the axis 136, which does not have gear teeth on the flat surface. The flat surface 142 is configured to not engage the mating helical teeth 138 of the slider plate 120 (FIG. 3B).

Figure 3C:
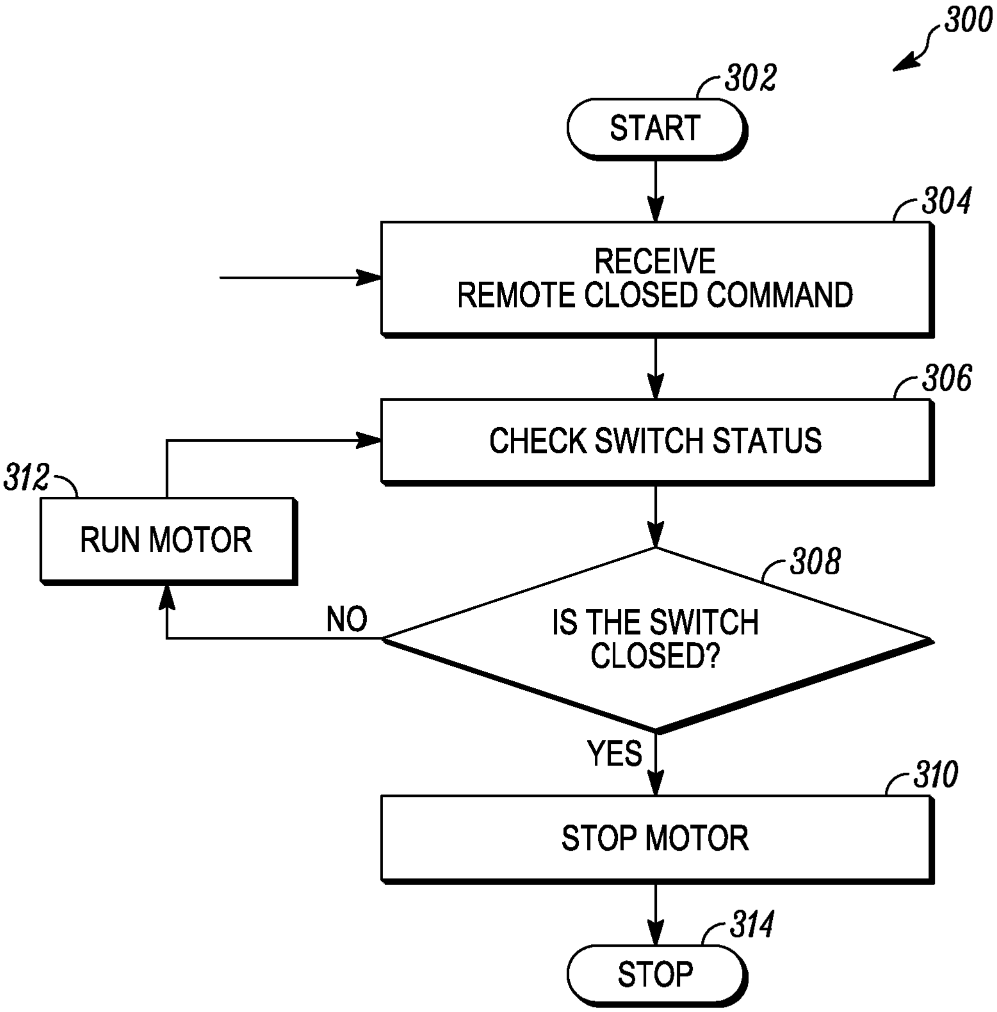
FIG. 3C is an example flow diagram that illustrates the operation of the microcontroller in the circuit breaker when it receives a remote command to close the main contacts.

The flow diagram 300 of FIG. 3C illustrates the operation of the microcontroller 200 (FIG. 1C1) in the circuit breaker when it receives a remote command to close the main contacts 102, 102'. The microcontroller 200 in the circuit breaker may be associated with a memory that stores computer code to carry out at least the operations represented by the flow diagrams of FIGS. 3C and 3D. The microcontroller may be a computer processor that executes computer instructions in the computer code, or the microcontroller my by an application specific integrated circuit that executes computer instructions in the form of firmware. The start block 302 of the flow diagram of FIG. 3C proceeds to Block 304 in which the microcontroller receives the remote command to close the main contacts. Closing the main contacts 102, 102' begins with transitioning from the open position in FIGS. 2A1, 2A2 to the initial closed position in FIGS. 2B1, 2B2 when the slider plate 120 begins to move toward the right. In block 306, the microcontroller checks the status of the electrical position switch 152. In block 308, the microcontroller determines whether the switch 152 is closed. If the switch 152 is closed, the operation proceeds to block 310 and the microcontroller stops the motor 150. Alternately, if the microcontroller determines that the switch 152 is not closed, the operation proceeds to block 312 and the microcontroller runs the motor 150 to continue pulling the slider plate toward the right in FIG. 2C2. The operation then loops back to block 306 and the microcontroller continues checking the status of the switch 152. The status of the switch 152 will continue to be checked until the microcontroller determines in block 308 that the switch is closed, at which time the microcontroller stops the motor in block 310. The flow diagram stops at block 314. The switch 152 is shown closed in FIGS. 2D1, 2D2 when the motor 150 has pulled the slider plate plate 120 fully toward the right, at which point the microcontroller stops the motor.

Figure 3D:
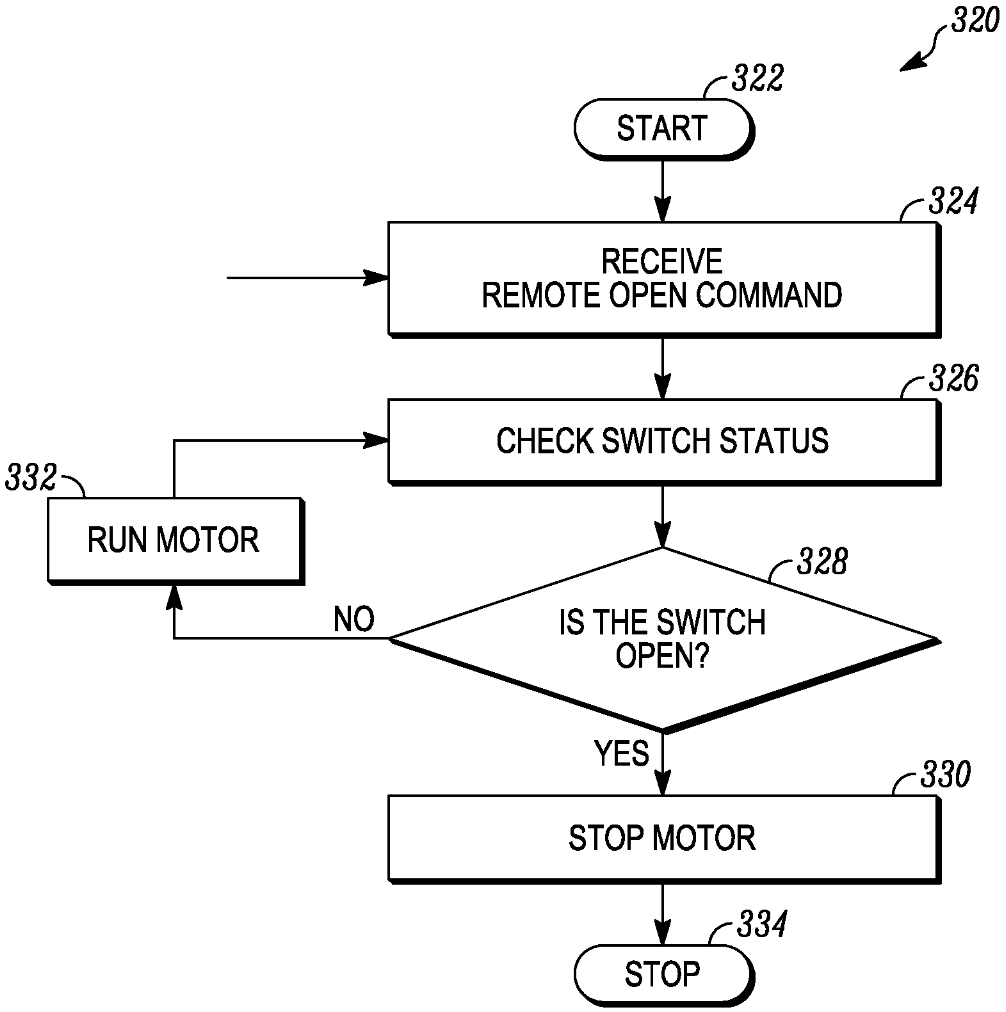
FIG. 3D is an example flow diagram that illustrates the operation of the microcontroller in the circuit breaker when it receives a remote command to open the main contacts.

The flow diagram 320 of FIG. 3D illustrates the operation of the microcontroller 200 (FIG. 1C1) in the circuit breaker when it receives a remote command to open the main contacts 102, 102'. The start block 322 of the flow diagram FIG. 3D proceeds to Block 324 in which the microcontroller receives the remote command to open the main contacts. The switch 152 is shown closed in FIGS. 2D1, 2D2 and the main contacts 102, 102' are closed. In block 326, the microcontroller checks the status of the electrical position switch 152. In block 328, the microcontroller determines whether the switch 152 is open. If the switch 152 is not open, then the operation proceeds to block 332 and the microcontroller runs the motor 150 to rotate the helical gear 130 so that its flat side no longer engages the slider plate 120, as shown in FIG. 2E2. The operation then loops back to block 326 and the microcontroller continues checking the status of the switch 152. The status of the switch 152 will continue to be checked until the microcontroller determines in block 328 that the switch 152 is open. The compression spring 124 releases its stored energy to force the slider plate 120 to move leftward away from the motor 150 and the switch 152 is opened, at which time the microcontroller stops the motor 150 in block 330. The flow diagram 320 stops at block 334. When the slider plate 120 moves further toward and pushes against the kicker lever 108, the main contacts 102, 102' are opened, as shown in FIGS. 2F1, 2F2.

After the microcontroller receives an open command to open the main contacts 102, 102' and has checked the status of the electrical position switch 152, the microcontroller energizes the motor 150 to resume the unidirectional rotation of the helical gear 130 to position the flat portion 142 that does not have gear teeth, to release the slider plate 120, as shown in FIGS. 2E1, 2E2 to slide past the helical gear 130. In response, the compression spring 124 releases its stored energy to force the slider plate 120 to move leftward away from the motor 150, as shown in FIGS. 2F1, 2F2. The end surface 122 of the slider plate 120 moves toward and pushes against the second end 112 of the kicker lever 108, causing the kicker lever 108 to rotate clockwise. The clockwise rotation of the kicker lever 108 causes the transverse surface 110' of the first end 110 of the kicker lever 108 to pivot against and push or kick the blade 104, to move blade 104 against the toggle spring 106 bias, from the closed position of FIGS. 2E1, 2E2 for the main contacts 102, 102' to the open position of FIGS. 2F1, 2F2 for the main contacts 102, 102'.

Figure 4C:
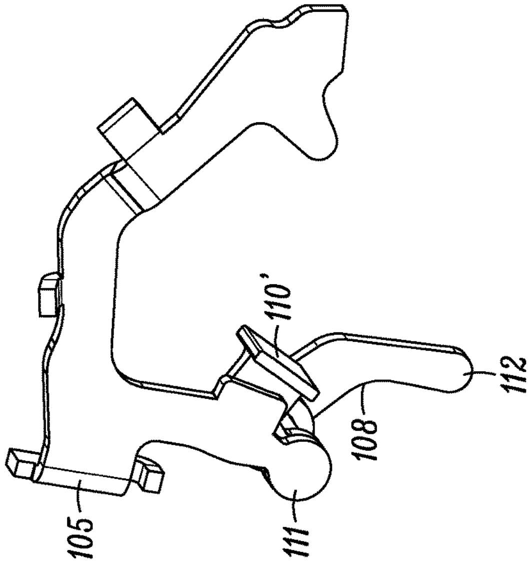
FIG. 4C is a perspective view of the two-part construction of the trip lever and the kicker lever in a remote control operation to open the main contacts, with the kicker lever pivoting to extend beyond the trip lever, thereby pushing against the blade in response to a remote control signal to open the main contacts by energizing the motor to rotate the flat portion of the helical gear to disengage the slider plate that is then propelled by the compression spring to contact the second end of the kicker lever to push against the blade, thereby opening the main contacts, according to an example embodiment of the disclosure.
Figure 4B:
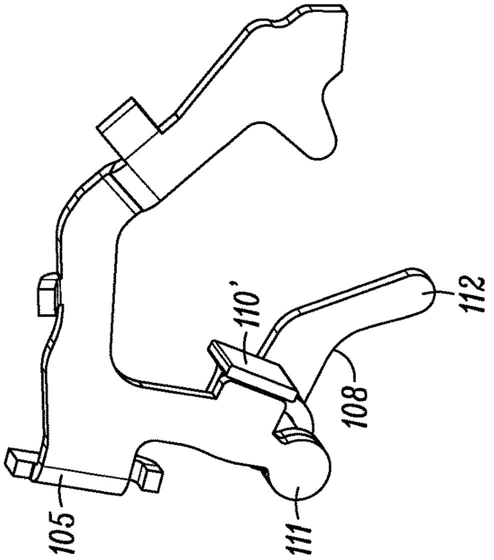
FIG. 4B is a perspective view of the two-part construction of the trip lever and the kicker lever in main contacts closed, ready to trip state, with the first end of the kicker lever remaining flush against the trip lever that is being pushed by the first end of the kicker lever, thereby pushing against the blade in response to a trip event, according to an example embodiment of the disclosure.
Figure 4A:
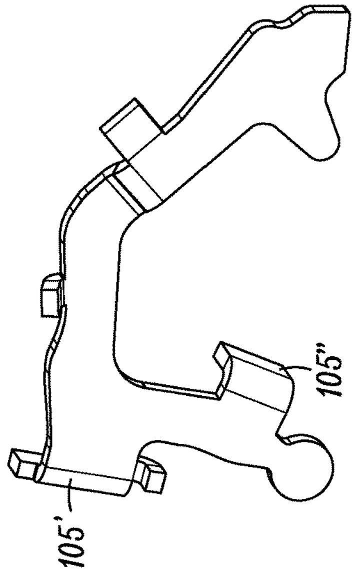
FIG. 4A PRIOR ART
FIG. 4A is a perspective view of an existing, prior art trip lever with the tab intact, which contacts the blade in response to a trip event.

FIG. 4A is a perspective view of an existing, prior art trip lever with the tab intact, which contacts the blade in response to a trip event. In a miniature circuit breaker without the remote control function of an example embodiment of the disclosure, a trip lever 105' (FIG. 4A) includes a transverse tab 105" that performs a kicker function to knock the blade 104 from the closed position to the open position of the main contacts in response to a trip event.

FIG. 4B is a perspective view of the two-part construction of the trip lever 105 and the kicker lever 108 in the ON or Tripped position with the first end 110 of the kicker lever 108 remaining flush against the trip lever 105 that is being pushed or kicked by the first end 110 of the kicker lever 108, thereby pushing against the blade 104 in response to a trip event, according to an example embodiment of the disclosure. The kicker function is broken out into a trip function that is activated to open the main contacts in response to a trip event. The trip lever 105 is pivotally mounted in the housing and separately mounted on a same pivot 111 as is mounted the kicker lever 108, the trip lever 105 being configured to push the first end 110 of the kicker lever 108 against the blade 104 (FIG. 1C1) to open the main contacts 102, 102' in a trip operation.

FIG. 4C is a perspective view of the two-part construction of the trip lever 105 and the kicker lever 108 in a remote control operation to open the main contacts. The separate, remote control function to open the main contacts in response to an external control signal, is enabled by the kicker lever 108 of an example embodiment of the disclosure. The kicker lever 108 has a first end 110 and a second end 112 on opposite sides of the pivotal mounting 111 of the kicker lever 108, with a transverse surface 110' on the first end 110 thereof configured to push or kick the blade 104 against the toggle spring 106 bias. When the end surface 122 of the slider plate 120 pushes the second end 112 of the kicker lever 108 as shown in FIGS. 2E1, 2E2, the kicker lever 108 is caused to pivotally rotate clockwise about its pivotal mounting 111, to thereby push the transverse surface 110' of the first end 110 of the kicker lever 108 against the blade 104 to push or kick the blade 104 against the toggle spring 106 bias, thereby moving the main contacts 102, 102' from the closed position of FIGS. 2E1, 2E2 to the open position of FIGS. 2F1, 2F2.

Figure 5C:
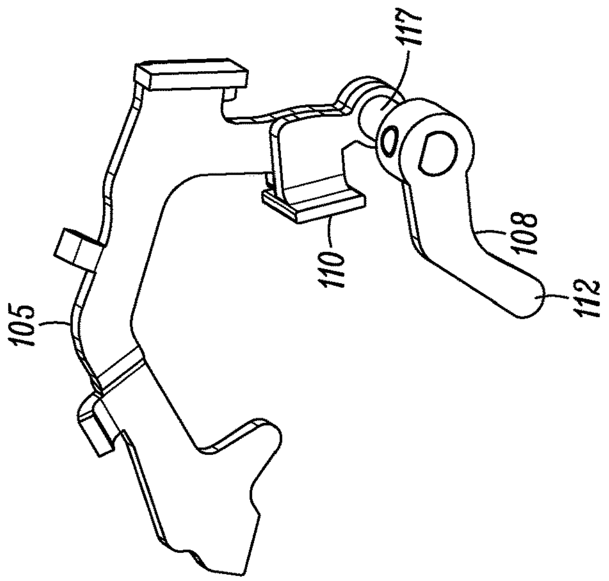
FIGS. 5A, 5B, and 5C are perspective front and rear views of the two-part construction of the trip lever and the kicker lever, according to an example embodiment of the disclosure.
Figure 5B:
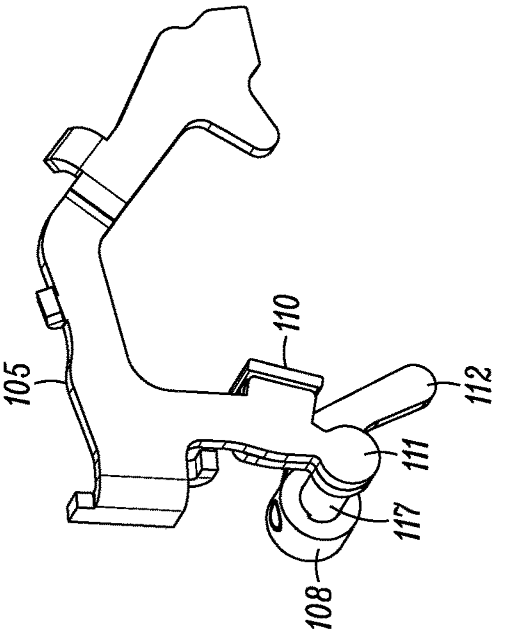
Figure 5A:
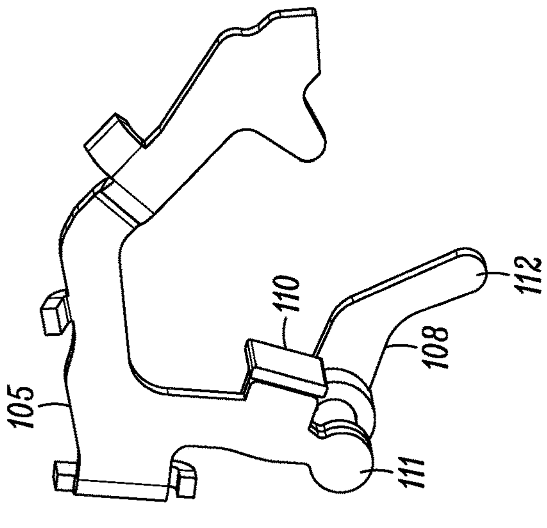
Figure 5D:
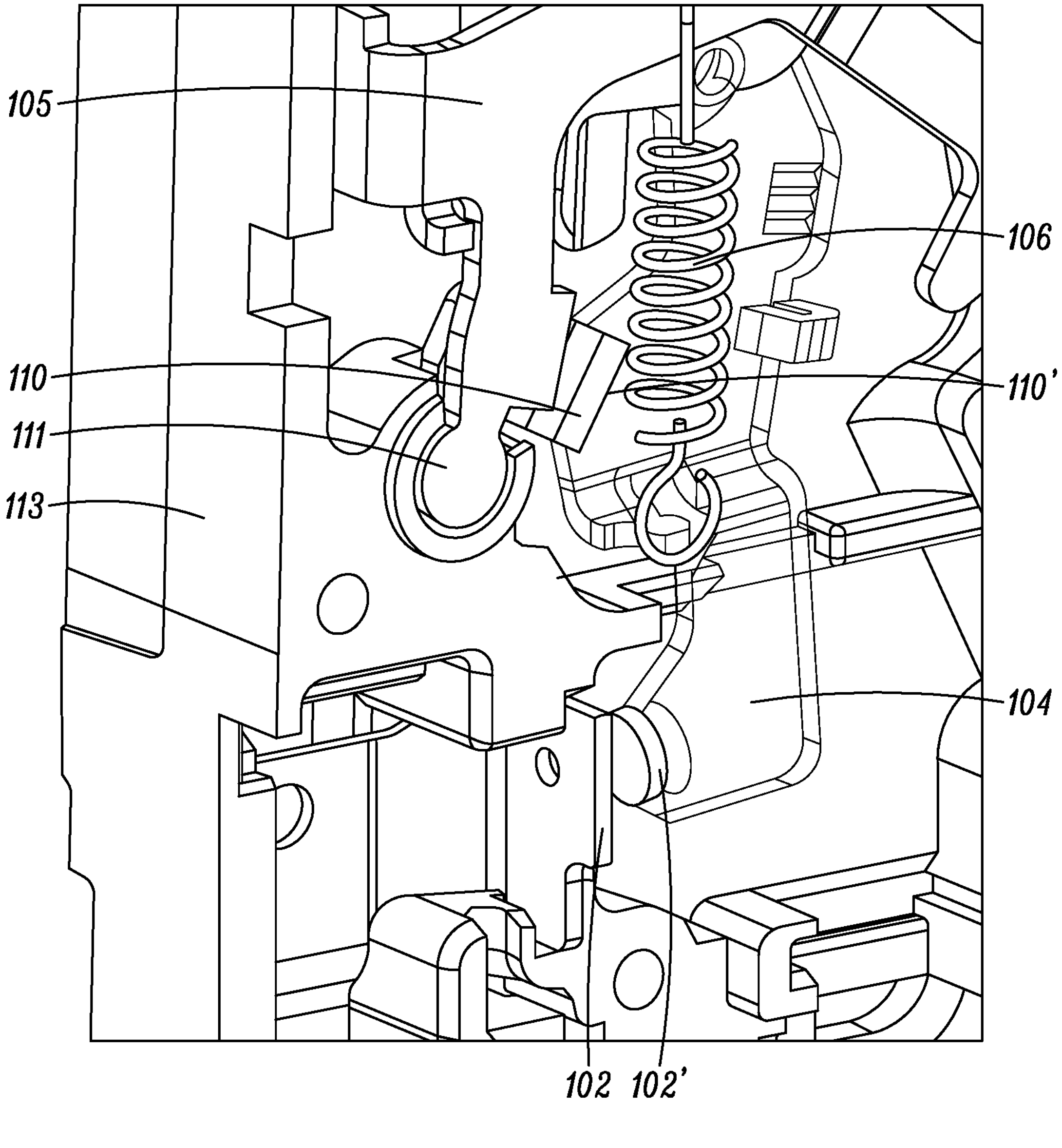
FIGS. 5D and 5E are close up full and cross sectioned perspective views of the trip lever and kicker lever pivot.
Figure 5E:
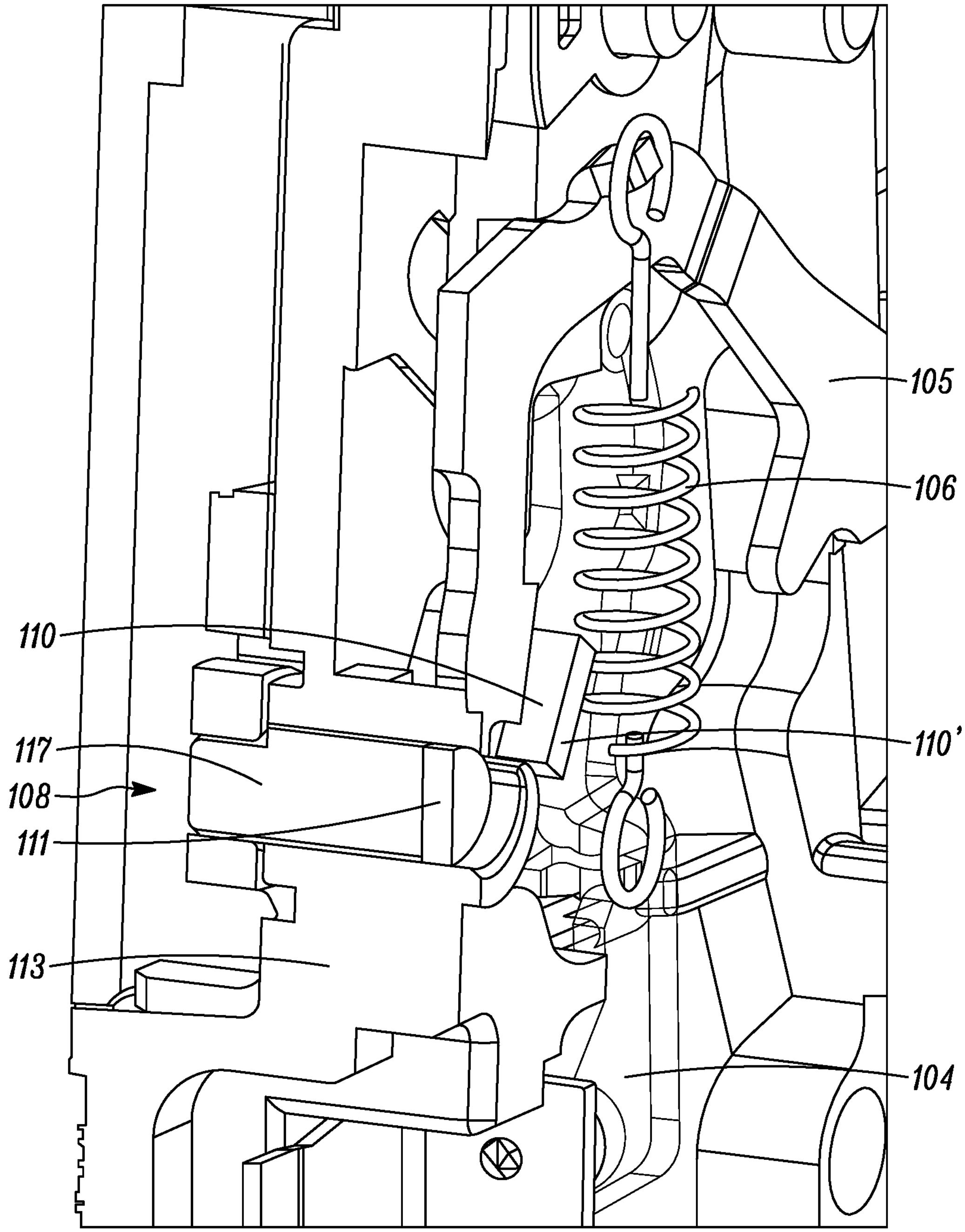

FIGS. 5A, 5B, 5C, 5D, and 5E are perspective views of the two-part construction of the trip lever 105 and the kicker lever 108, according to an example embodiment of the disclosure. The kicker lever 108 is pivotally mounted on the pivot 111 in the housing 113 and shares the same pivotal mounting 111 with the trip lever 105. A connecting shaft 117 that is coaxial with the pivot 111, joins the first end 110 of the kicker lever 108 with the second end 112, as shown in FIG. 5C. The shaft 117 is rotationally mounted in the housing 113, as shown in FIGS. 5D and 5E. The toggle bias spring 106 is a tension spring connected on one end to the blade 104 and on the other end to the trip lever 105, as shown in FIG. 5E.

Figure 6A:
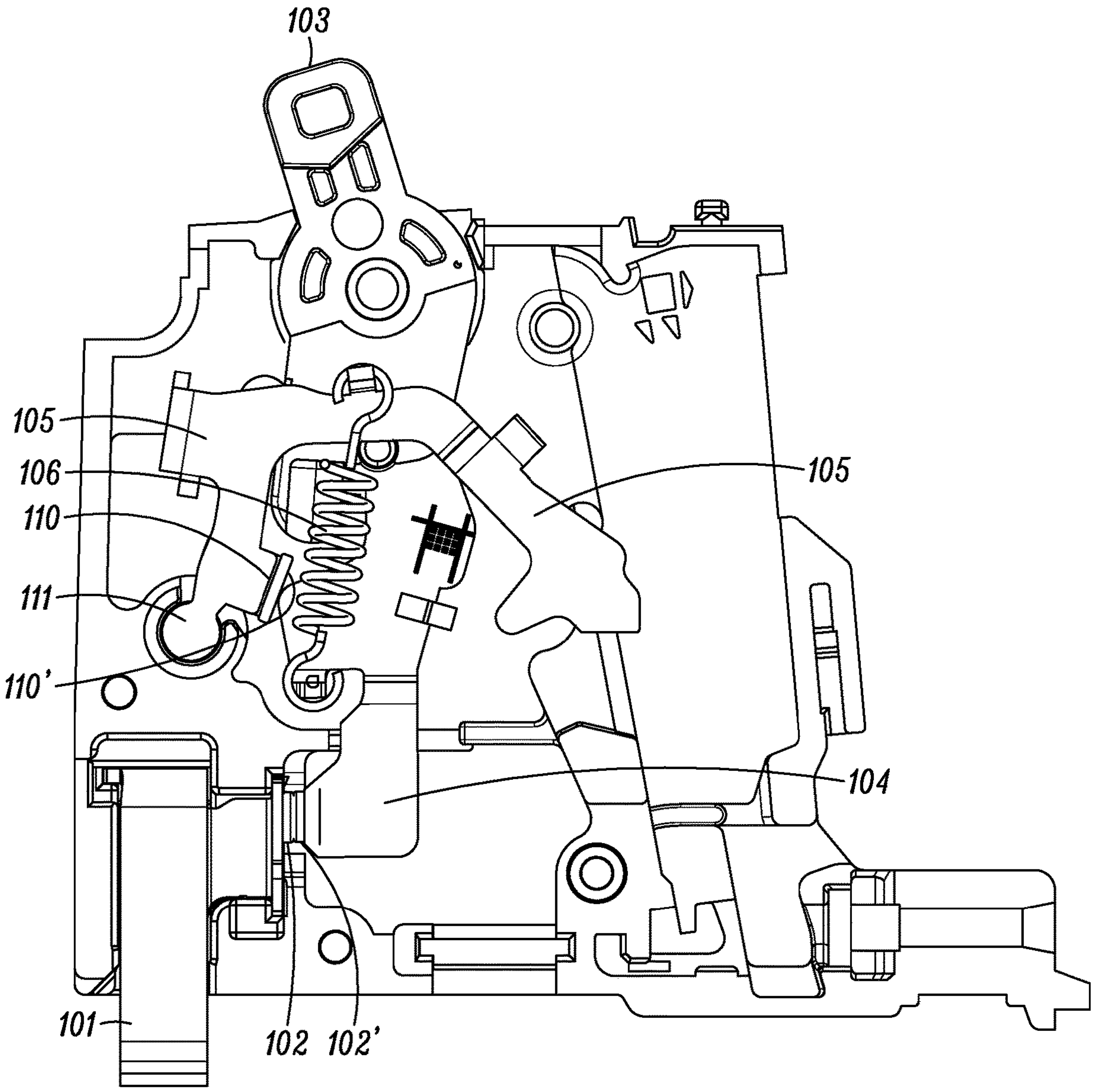
FIGS. 6A, 6B, and 6C show the positions of the trip lever, kicker lever, handle, blade, and toggle spring, respectively.
Figure 6B:
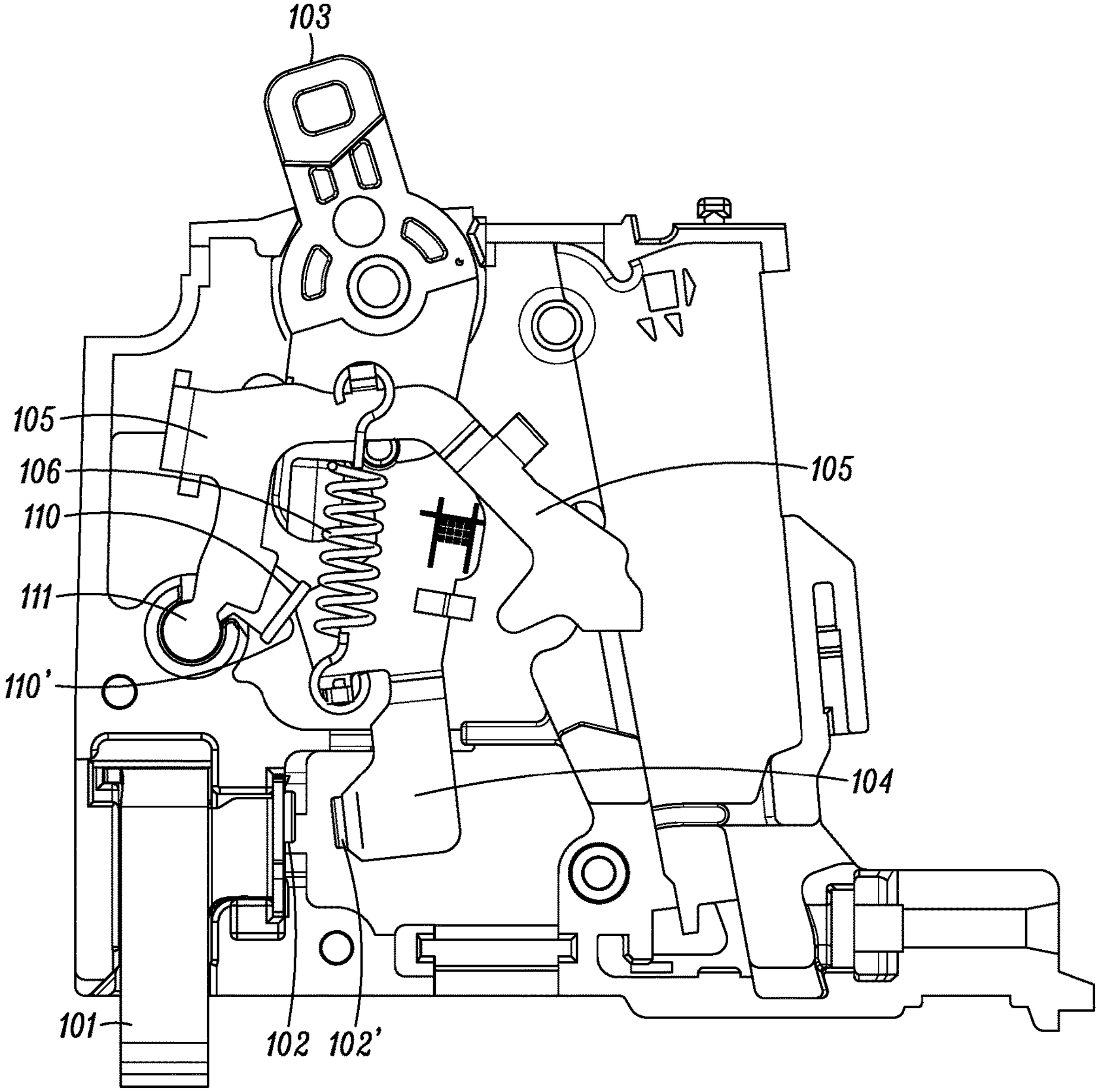
Figure 6C:
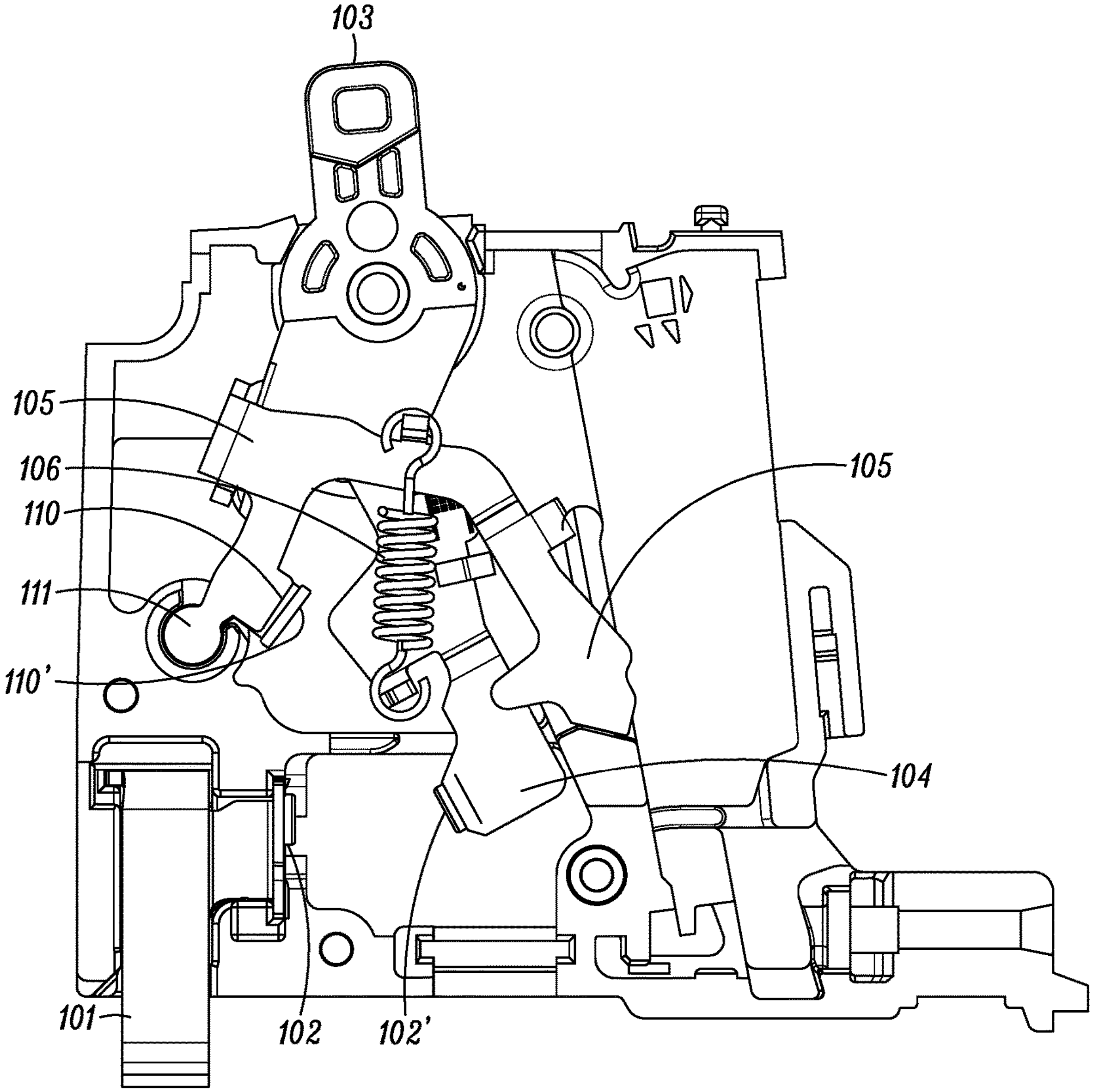

FIGS. 6A, 6B, and 6C show the positions of the trip lever, kicker lever, handle, blade, and toggle spring, respectively. FIG. 6A shows the state of main contacts closed, handle ON, trip lever and kicker lever in ON. FIG. 6B shows the state of main contacts open from remote control, handle in ON, trip lever in ON, kicker lever open, and toggle spring slightly rotated to follow blade. FIG. 6C shows the state of main contacts fully open from trip event, trip lever and kicker lever in TRIPPED, handle in TRIPPED, main toggle spring in TRIPPED, with the first end of the kicker lever remaining flush against the trip lever that is being pushed by the first end of the kicker lever, thereby pushing against the blade in response to a trip event, according to an example embodiment of the disclosure.

Although the miniature circuit breaker 100 is described as a single pole device, the principles of operation of the disclosed single pole device may also be applied to a multi-pole device with multiple trip levers 105, main contacts 102, 102', kicker levers 108, and one or more motors 150, gears 130, slider plates 120, and any combination of these parts.

The resulting apparatus and system enables remote control of a miniature circuit breaker.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "component", "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A remote controlled miniature circuit breaker, comprising:

a helical gear configured to engage with mating teeth of a slider plate coupled to main contacts of the circuit breaker;

a unidirectional motor mounted in the circuit breaker, configured to respond to an external signal to close the main contacts, to drive the helical gear in a unidirectional rotation while the helical gear engages the mating teeth of the slider plate, thereby moving the slider plate to close main contacts;

a blade pivotally mounted in a housing of the remote controlled miniature circuit breaker, having a moveable main electrical contact that is aligned with a stationary main electrical contact mounted in the housing;

a kicker lever pivotally mounted in the housing, having a first end and a second end on opposite sides of the pivotal mounting of the kicker lever; and a trip lever pivotally mounted in the housing and separately mounted on a same pivot as is mounted the kicker lever, the trip lever configured to push the first end of the kicker lever against the blade to open the main contacts in a trip operation.

2. The remote controlled miniature circuit breaker of claim 1, wherein the helical gear includes a flat portion configured to allow the sliding plate to slide past helical gear.

3. The remote controlled miniature circuit breaker of claim 1, the motor further configured to respond to an external signal to open the main contacts, to resume the unidirectional rotation of the helical gear to position a flat portion of the helical gear to allow the slider plate to slide past the helical gear, to thereby open the main contacts.

4. The remote controlled miniature circuit breaker of claim 1, wherein the blade is spring biased by a toggle spring to pivot from an open position for the main contacts to a closed position for the main contacts.

5. The remote controlled miniature circuit breaker of claim 4, wherein a surface on the first end of the kicker lever is configured to push the blade against the toggle spring bias.

6. The remote controlled miniature circuit breaker of claim 5, wherein the kicker lever is further configured to rotate counterclockwise about its pivot when the main contacts are in the open position so that the surface of the kicker lever relieves pressure on the blade, and the blade is thereby forced by the toggle spring bias to the closed position for the main contacts.

7. A remote controlled miniature circuit breaker, comprising:

a slider plate slidably mounted in the circuit breaker, configured to open and close main contacts of the circuit breaker;

a helical gear mounted on a rotary shaft in the circuit breaker, configured to engage teeth of the helical gear with mating teeth of the slider plate;

a unidirectional motor mounted in the circuit breaker, configured to drive the helical gear in a unidirectional rotation during a first portion of a circumference of the helical gear when it is engaging mating teeth of the slider plate, to thereby pull the slider plate away from the main contacts, to thereby close main contacts of the circuit breaker, in response to an external signal to close main contacts of the circuit breaker;

a compression spring mounted in the circuit breaker, configured to apply a compression spring bias against motion of the slider plate as it is pulled by the helical gear away from the main contacts;

an electrical position switch mounted in the circuit breaker monitored by a microcontroller in the circuit breaker, the switch configured to engage and be activated by the motion of the slider plate to stop the unidirectional rotation of the motor while the main contacts are in the closed position and the teeth in the first portion of the circumference of the helical gear are engaged with the mating teeth of the slider plate;

a blade pivotally mounted in a housing of the remote controlled miniature circuit breaker, having a moveable main electrical contact that is aligned with a stationary main electrical contact mounted in the housing, the blade being spring biased by a toggle spring to pivot from an open position for the main contacts to a closed position for the main contacts;

a kicker lever pivotally mounted in the housing, having a first end and a second end on opposite sides of the pivotal mounting of the kicker lever, with a surface on the first end thereof configured to push the blade against the toggle spring bias, the kicker lever configured to rotate counterclockwise about its pivot when the main contacts are in the open position so that the surface of the kicker lever relieves pressure on the blade, and the blade is thereby forced by the toggle spring bias to the closed position for the main contacts; and a trip lever pivotally mounted in the housing and separately mounted on a same pivot as is mounted the kicker lever, the trip lever configured to push the first end of the kicker lever against the blade to open the main contacts in a trip operation, wherein the microcontroller is configured to respond to an external signal to open the main contacts, by energizing the motor to resume the unidirectional rotation of the helical gear to position a flat portion to not engage the mating teeth of the slider plate, to release the slider plate to slide past the helical gear in response to the compression spring bias, thereby forcing the slider plate to move toward the main contacts to open the main contacts.

8. The remote controlled miniature circuit breaker of claim 7, further comprising:

the slider plate slidably mounted in the housing, having an end surface configured to push against the second end of the kicker lever to open the main contacts when the slider plate moves in transitioning from the closed position to the open position, thereby causing the end surface of the slider plate to push the kicker lever to pivotally rotate clockwise about its pivotal mounting, to thereby push the surface of the first end of the kicker lever against the blade to push the blade against the toggle spring bias, thereby moving the main contacts from the closed position to the open position.

9. The remote controlled miniature circuit breaker of claim 8, further comprising:

the slider plate further configured to close the main contacts in transitioning from the open position to the closed position, by moving to relieve pressure on the second end of the kicker lever, thereby rotating the kicker lever counterclockwise about its pivot, the surface of the kicker lever thereby relieving pressure on the blade, the blade thereby forced by the toggle spring bias to the closed position for the main contacts.

10. The remote controlled miniature circuit breaker of claim 9, further comprising:

the helical gear being mounted on the rotary shaft in the housing, having an axis.

11. The remote controlled miniature circuit breaker of claim 10, further comprising:

the compression spring being mounted in the housing, configured to apply the compression spring bias against the slider plate to urge the end surface of the slider plate toward the second end of the kicker lever.

12. The remote controlled miniature circuit breaker of claim 11, further comprising:

the unidirectional motor being mounted in the housing, configured to rotate the helical gear and cause the slider plate to begin moving the end surface of the slider plate away from the second end of the kicker lever, thereby relieving pressure on the second end of the kicker lever, which thereby rotates counterclockwise about its pivot so that the surface of the kicker lever relieves pressure on the blade, and the blade is forced by the toggle spring bias to the closed position for the main contacts, with the compression spring being compressed as the slider plate moves.

13. The remote controlled miniature circuit breaker of claim 12, further comprising:

the electrical position switch being mounted in the housing, the switch beginning to be contacted by the slider plate in response to the motor further pulling the slider plate closer to the motor, the switch becoming activated and the compression spring becoming fully compressed in response to the motor pulling the slider plate fully toward and close to the motor.

14. The remote controlled miniature circuit breaker of claim 13, further comprising:

the flat portion of the helical gear being parallel to the axis.

15. The remote controlled miniature circuit breaker of claim 14, further comprising:

the electrical position switch monitored by the microcontroller configured to respond to the external signal to open the main contacts by energizing the motor to resume the unidirectional rotation of the helical gear to position the flat portion to release the slider plate to slide past the helical gear;

the compression spring configured to release its stored energy to force the slider plate to move away from the motor, the end surface of the slider plate configured to move toward and push against the second end of the kicker lever, causing the kicker lever to rotate clockwise, thereby causing the surface of the first end of the kicker lever to pivot against and push the blade, to move blade against the toggle spring bias, from the closed position for the main contacts to the open position for the main contacts.

16. A remote controlled miniature circuit breaker, comprising:

a slider plate slidably mounted in the circuit breaker, configured to open and close main contacts of the circuit breaker, in response to the slider plate sliding respectively toward or away from the main contacts;

a helical gear mounted on a rotary shaft in the circuit breaker, configured to engage teeth of the helical gear with mating teeth of the slider plate;

a unidirectional motor mounted in the circuit breaker, configured to drive the helical gear in a unidirectional rotation during a first portion of a circumference of the helical gear when it is engaging mating teeth of the slider plate;

a blade pivotally mounted in a housing of the remote controlled miniature circuit breaker, having a moveable main electrical contact that is aligned with a stationary main electrical contact mounted in the housing, the blade being spring biased by a toggle spring to pivot from an open position for the main contacts to a closed position for the main contacts;

a kicker lever pivotally mounted in the housing, having a first end and a second end on opposite sides of the pivotal mounting of the kicker lever, with a surface on the first end thereof configured to push the blade against the toggle spring bias, the kicker lever configured to rotate counterclockwise about its pivot when the main contacts are in the open position so that the surface of the kicker lever relieves pressure on the blade, and the blade is thereby forced by the toggle spring bias to the closed position for the main contacts; and a trip lever pivotally mounted in the housing and separately mounted on a same pivot as is mounted the kicker lever, the trip lever configured to push the first end of the kicker lever against the blade to open the main contacts in a trip operation.

17. The remote controlled miniature circuit breaker of claim 16, comprising:

a compression spring mounted in the circuit breaker, configured to apply a compression spring bias against motion of the slider plate as it is pulled by the helical gear away from the main contacts;

an electrical position switch mounted in the circuit breaker and monitored by a microcontroller configured to engage and be activated by the motion of the slider plate to stop the unidirectional rotation of the motor while the main contacts are in the closed position and the teeth in the first portion of the circumference of the helical gear are engaged with the mating teeth of the slider plate; and wherein the microcontroller is configured to respond to an external signal to open the main contacts, by energizing the motor to resume the unidirectional rotation of the helical gear to position a flat portion to not engage the mating teeth of the slider plate, to release the slider plate to slide past the helical gear in response to the compression spring bias to force the slider plate to move toward the main contacts to open the main contacts.

18. An apparatus for remote control of a miniature circuit breaker, comprising:

a blade pivotally mounted in a miniature circuit breaker housing, having a moveable main electrical contact that is aligned with a stationary main electrical contact mounted in the housing;

a kicker lever pivotally mounted in the housing, having a first end and a second end on opposite sides of the pivotal mounting of the kicker lever;

a trip lever pivotally mounted in the housing and separately mounted on a same pivot as is mounted the kicker lever, the trip lever configured to push the first end of the kicker lever against the blade to open the main contacts in a trip operation;

a slider plate slidably mounted in the housing, having an end surface configured to push against the second end of the kicker lever, to pivotally rotate the kicker lever about its pivotal mounting;

a compression spring mounted in the housing, configured to apply a compression spring bias against the slider plate to urge the end surface thereof toward the second end of the kicker lever;

a helical gear mounted on a rotary shaft having an axis, configured to engage helical teeth thereof with mating helical teeth of the slider plate;

a unidirectional motor mounted in the housing, configured to drive the helical gear in a unidirectional rotation during a first portion of a circumference of the helical gear engaging the mating helical teeth of the slider plate, and cause the slider plate to move the end surface of the slider plate away from the second end of the kicker lever;

an electrical position switch mounted in the housing and monitored by a microcontroller configured to engage the slide plate and stop the unidirectional rotation of the motor when the main contacts have reached a desired open position during the first portion of the circumference of the helical gear engaging the mating helical teeth of the slider plate;

the helical gear including a flat portion parallel to the axis, which does not have gear teeth on a flat surface, the flat surface configured to not engage the mating helical teeth of the slider plate; and the microcontroller being configured to respond to an external command to open the main contacts, by energizing the motor to resume the unidirectional rotation of the helical gear to position the flat portion that does not have gear teeth so as to not engage the mating helical teeth of the slider plate, causing the compression spring to force the slider plate to move the end surface of the slider plate toward and push against the second end of the kicker lever, thereby causing the surface of the first end of the kicker lever to pivot against and push the blade to move against a toggle spring bias, from the closed position for the main contacts to the open position for the main contacts.

* * * * *